(12) United States Patent
Tochio et al.

(10) Patent No.: US 9,264,283 B2
(45) Date of Patent: Feb. 16, 2016

(54) METHOD OF ACCOMMODATING SIGNALS, FRAME GENERATION APPARATUS, FRAME RECEPTION APPARATUS, AND TRANSMISSION SYSTEM

(71) Applicant: FUJITSU LIMITED, Kawasaki (JP)

(72) Inventors: Yuji Tochio, Yokohama (JP); Toru Katagiri, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 278 days.

(21) Appl. No.: 13/750,480

(22) Filed: Jan. 25, 2013

(65) Prior Publication Data

US 2013/0136008 A1    May 30, 2013

Related U.S. Application Data

(63) Continuation of application No. PCT/JP2010/062885, filed on Jul. 30, 2010.

(51) Int. Cl.
*H04J 1/16* (2006.01)
*H04L 29/02* (2006.01)
*H04J 3/16* (2006.01)

(52) U.S. Cl.
CPC ............... *H04L 29/02* (2013.01); *H04J 3/1652* (2013.01); *H04J 3/1664* (2013.01)

(58) Field of Classification Search
None
See application file for complete search history.

(56) References Cited

U.S. PATENT DOCUMENTS

| 7,848,653 | B2 * | 12/2010 | Zou ................................ | 398/72 |
| 2003/0048813 | A1 | 3/2003 | Lahav et al. | |
| 2004/0062277 | A1 | 4/2004 | Flavin et al. | |
| 2007/0189336 | A1 * | 8/2007 | Zou ............................... | 370/505 |
| 2007/0248121 | A1 * | 10/2007 | Zou ............................... | 370/498 |
| 2008/0080860 | A1 | 4/2008 | Katagiri | |
| 2008/0107418 | A1 * | 5/2008 | Zhang ............................ | 398/98 |
| 2008/0232247 | A1 * | 9/2008 | Evans et al. .................... | 370/228 |
| 2008/0232818 | A1 | 9/2008 | Narita et al. | |
| 2009/0074410 | A1 * | 3/2009 | Zou et al. ........................ | 398/52 |
| 2010/0067547 | A1 | 3/2010 | Katagiri et al. | |

(Continued)

FOREIGN PATENT DOCUMENTS

| EP | 1657839 A1 | 5/2006 |
| EP | 1826926 A1 | 8/2007 |

(Continued)

OTHER PUBLICATIONS

Office Action mailed Oct. 22, 2013 in corresponding Japanese Application No. 2012-526255.

(Continued)

*Primary Examiner* — Kibrom T Hailu
(74) *Attorney, Agent, or Firm* — Staas & Halsey LLP

(57) ABSTRACT

For a frame comprising a payload region in which a client signal is to be accommodated, and an overhead region accommodation location information indicating a location where the client signal is to be accommodated, the frame being able to be processed as an m (m is an integer equal to or greater than 2)-byte cycle multiframe, the location information for the frame is defined as an m×n (n is an integer equal to or greater than 2)-byte cycle multiframe; using the location information defined as the multiframe, the location where the client signal is to be accommodated in the payload region is defined; and the client signal is accommodated in the payload region, based on the defined location where the client signal is to be accommodated.

17 Claims, 28 Drawing Sheets

(56) References Cited

U.S. PATENT DOCUMENTS

| | | | |
|---|---|---|---|
| 2010/0142947 A1* | 6/2010 | Shin et al. | 398/43 |
| 2010/0183301 A1* | 7/2010 | Shin et al. | 398/45 |

FOREIGN PATENT DOCUMENTS

| | | |
|---|---|---|
| JP | 2004-523959 | 8/2004 |
| JP | 2008-92130 | 4/2008 |
| JP | 2008-113394 | 5/2008 |
| JP | 2008-227995 | 9/2008 |
| JP | 2010-62682 | 3/2010 |
| JP | 2010-136380 | 6/2010 |
| WO | 02/063834 | 8/2002 |

OTHER PUBLICATIONS

Interfaces for the Optical Transport Network (OTN), International Telecommunication Union Telecommunication Standardization Sector, ITU-T Recommendation G.709/Y.1331, Mar. 2003, pp. i-iv, 1-109.

International Search Report of PCT/JP2010/062885 mailed Nov. 2, 2010.

* cited by examiner

ODU1

ODU2

OTU2

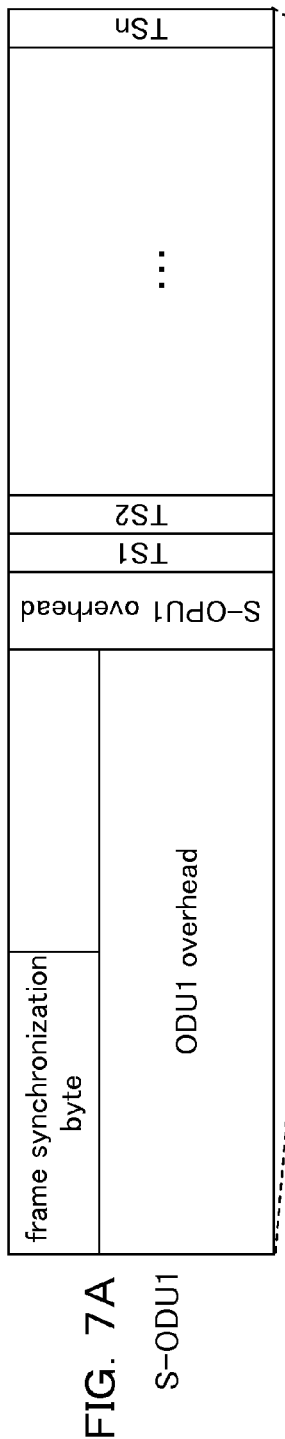
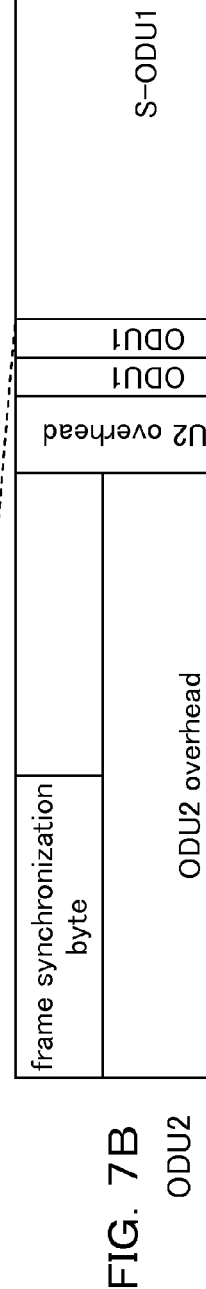
FIG. 7A S-ODU1
FIG. 7B ODU2
FIG. 7C OTU2

FIG. 8A

| PSI | 1 2 | 3 4 5 6 7 8 | TS |
|---|---|---|---|
| PSI[2] | ODTU type | Tributary Port # | TS1 |
| PSI[3] | ODTU type | Tributary Port # | TS2 |
| PSI[4] | ODTU type | Tributary Port # | TS3 |
| PSI[5] | ODTU type | Tributary Port # | TS4 |
| PSI[6] | ODTU type | Tributary Port # | TS5 |
| PSI[7] | ODTU type | Tributary Port # | TS6 |
| PSI[8] | ODTU type | Tributary Port # | TS7 |
| PSI[9] | ODTU type | Tributary Port # | TS8 |

FIG. 8B

| PSI[1+i] | ODTU type (1 2) | Tributary Port # (3 4 5 6 7 8) | TS#i |
|---|---|---|---|

00:ODTU12
01:Reserved
10:ODTU2.ts
11:Unallocated 00 0000:Tributary Port 1
00 0001:Tributary Port 2
00 0010:Tributary Port 3
00 0011:Tributary Port 4
⋮
00 0111:Tributary Port 8

FIG. 9A

| | 1 | 2 | 3 | 4 | 5 | 6 | 7 | 8 | |
|---|---|---|---|---|---|---|---|---|---|
| PSI[2] | ODTU type | | Tributary Port # | | | | | | TS1 |
| PSI[3] | ODTU type | | Tributary Port # | | | | | | TS2 |
| PSI[4] | ODTU type | | Tributary Port # | | | | | | TS3 |
| PSI[5] | ODTU type | | Tributary Port # | | | | | | TS4 |
| PSI[6] | ODTU type | | Tributary Port # | | | | | | TS5 |
| ⋮ | ⋮ | | ⋮ | | | | | | ⋮ |
| PSI[33] | ODTU type | | Tributary Port # | | | | | | TS32 |

FIG. 9B

| | 1 | 2 | 3 | 4 | 5 | 6 | 7 | 8 | |
|---|---|---|---|---|---|---|---|---|---|
| PSI[1+i] | ODTU type | | Tributary Port # | | | | | | TS#i |

00:ODTU13
01:ODTU23
10:ODTU3.ts
11:Unallocated 00 0000:Tributary Port 1
00 0001:Tributary Port 2
00 0010:Tributary Port 3
00 0011:Tributary Port 4
⋮
01 1111:Tributary Port 32

FIG. 10A

| | | OMFI OH Byte | | | | | |
|---|---|---|---|---|---|---|---|
| 1 | 2 | 3 | 4 | 5 | 6 | 7 | 8 |

Fixed to 0

⋮

| 0 | 0 | 0 | 0 | 0 | 0 | 0 |
|---|---|---|---|---|---|---|
| 0 | 0 | 0 | 0 | 0 | 0 | 1 |
| 0 | 0 | 0 | 0 | 0 | 1 | 0 |
| 0 | 0 | 0 | 0 | 0 | 1 | 1 |
| 0 | 0 | 0 | 0 | 1 | 0 | 0 |

⋮

| 1 | 0 | 0 | 1 | 1 | 1 | 0 |
| 1 | 0 | 0 | 1 | 1 | 1 | 1 |
| 0 | 0 | 0 | 0 | 0 | 0 | 0 |
| 0 | 0 | 0 | 0 | 0 | 0 | 1 |

⋮

OMFI sequence

FIG. 10B

| | 1 | 2 | 3 | 4 | 5 | 6 | 7 | 8 | 1.25 G TS |
|---|---|---|---|---|---|---|---|---|---|
| PSI[2] | | 11 | | | 00 0000 | | | | TS1 |
| PSI[3] | | 11 | | | 00 0001 | | | | TS2 |

FIG. 13

| # | service definition | service band (sum) | TS allocation |
|---|---|---|---|
| 1 | VLAN ID=X<br>Port=A | P Mbps | {#1, a, ...} |
| 2 | VLAN ID=Y<br>Port=B | Q Gbps | {#b, d, ...} |
| 3 | Port=C, D | 2 Gbps | {#j, k, ...} |
| . | . | . | . |
| . | . | . | . |
| . | . | . | . |

FIG. 14

| TS | content |
|---|---|
| 1 | S-ODU |
| 2 | S-ODU |
| 3 | ODU |
| . | . |
| . | . |
| . | . |

FIG. 22A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Signal Type |    Reserved     |              NMC              |
+-+-+-+-+-+-+-+-+-+-+-+-+-+-+-+-+-+-+-+-+-+-+-+-+-+-+-+-+-+-+-+-+
|             NVC               |        Multiplier (MT)        |
+-+-+-+-+-+-+-+-+-+-+-+-+-+-+-+-+-+-+-+-+-+-+-+-+-+-+-+-+-+-+-+-+
|                            Reserved                           |
+-+-+-+-+-+-+-+-+-+-+-+-+-+-+-+-+-+-+-+-+-+-+-+-+-+-+-+-+-+-+-+-+

Generalized label request and traffic parameters
```

FIG. 22B

```
Value   Type
-----   ----
0       Not significant
1       ODU1  (i.e., 2.5 Gbps) /*The size of OPU2 TS is 2.5G*/
2       ODU2  (i.e., 10  Gbps) /*The size of OPU2 TS is 2.5G*/
3       ODU3  (i.e., 40  Gbps) /*The size of OPU3 TS is 2.5G*/
4       Reserved (for future use)
5       Reserved (for future use)
6       OCh at 2.5 Gbps
7       OCh at 10  Gbps
8       OCh at 40  Gbps
9       OCh at 100 Gbps
10      ODU0
11      ODU1      /*The size of OPU1 TS is 1.25G*/
12      ODU2      /*The size of OPU2 TS is 1.25G*/
13      ODU3      /*The size of OPU3 TS is 1.25G*/
14      ODU4      /*The size of OPU4 TS is 1.25G*/
15      ODU2e     /*10Gbps for FC1200 and GE LAN */
16      ODU3e1    /*The size of OPU3e1 TS is 2.5G */    [NN]
17      ODU3e2    /*The size of OPU3e2 TS is 1.25G */   [NN]
18      ODUflex   /*The size of OPU2/OPU3/OPU4 TS is 1.25G */
19      ODUflex   /*The size of OPU2/OPU3/OPU4 TS is 2.5G */ [NN]
20-255  Reserved (for future use)

Signal Type values
```

FIG. 26

|  | IN | OUT |
|---|---|---|
| #1 | S-ODU#1<br>TS={a, b, c} | S-ODU#2<br>TS={d, e, f} |
| #2 | S-ODU#3<br>TS={x, y} | S-ODU#1<br>TS={v, w} |
| ... | ... | ... |

METHOD OF ACCOMMODATING SIGNALS, FRAME GENERATION APPARATUS, FRAME RECEPTION APPARATUS, AND TRANSMISSION SYSTEM

CROSS-REFERENCE TO RELATED APPLICATION

This application is a continuation application of a PCT international application No. PCT/JP2010/062885 filed on Jul. 30, 2010 in Japan, the entire contents of which are incorporated by reference.

FIELD

The embodiments discussed herein are related to a method of accommodating signals, a frame generation apparatus, a frame reception apparatus, and a transmission system.

BACKGROUND

In networks, such as core networks that transfer information among multiple regions and metro networks that transfer information within a region, the Optical Transport Network (OTN) has been used, which is a standard for optical transmissions, and is recommended by the International Telecommunication Union Telecommunication Standardization Sector (ITU-T).

The OTN enables a wide variety of client signals, such as synchronous digital hierarchy/synchronous optical network (SDH/SONET) signals, Ethernet® signals, time division multiplexing (TDM) signals, to be accommodated into OTN frames, e.g., optical channel payload units (OPUs), optical channel data units (ODUs), and optical channel transport units (OTU), for transmission.

In recent years, traffics have surged in access networks which aggregate into core networks (or metro networks).

Under such backgrounds, in order to accommodate signals from an access network into a core network (or a metro network), techniques have been demanded, which can efficiently accommodate signals in different bands (bit rates), such as SDH/SONET signals, Ethernet® signals, TDM signals, into OTN frames.

As an example of such techniques, multiplication of ODU frames was stipulated by the ITU-T. Further, ODU flex frames which can accommodate client signals in a unit of 1.25 Gbps are also stipulated (refers to Non-Patent Reference 1 listed below).

Patent Reference 1 listed below discloses a technique wherein OTN frames standardized by the ITU are uniformly applied, independently of the types of signals to be accommodated, and the signals are accommodated in SDH/SONET frames, which have been standardized by the ITU correspondingly to OTN frames.

Patent Reference 2 listed below discloses a technique wherein specialized framing and encoding are executed on SONET/SDH signals and 10 Gb E-WANPHY signals, and the bit rates of the SONET/SDH signals and 10 Gb E-WANPHY signals are adjusted to the bit rates equivalent to those of 10 Gb E-LANPHY signals, followed by transparently mapping these signals to a single wavelength for WDM signals, for transmitting the mixed signals.

In addition, Patent Reference 3 listed below discloses a technique wherein transmission data is mapped to a payload region while relating it to the identifier of an overhead region on the transmission side, while reassembling received data from the payload region, using the identifier, on the reception side.

Further, Patent Reference 4 listed below discloses a technique wherein, upon accommodating the frequency deviation exceeding the frequency deviation that can be accommodated by NJO bytes, the data corresponding to the frequency deviation exceeding the frequency deviation accommodatable by NJO bytes is stored in FS bytes defined in an OTU frame.
Patent Reference 1: Japanese Laid-open Patent Publication No. 2008-227995
Patent Reference 2: Japanese Laid-open Patent Publication No. 2008-92130
Patent Reference 3: Japanese Translation of PCT International Application No. 2004-523959
Patent Reference 4: Japanese Laid-open Patent Publication No. 2008-113394
Non-Patent Reference 1: Interfaces for the Optical Transport Network (OTN), ITU-T (International Telecommunication Union Telecommunication Standardization Sector), Recommendation G.709

Client signals are accommodated in tributary slots (TSs) located in a payload region in an OTN frame.

Such TSs, however, are merely designed for accommodating client signals being propagated between Ethernet® physical ports.

In other words, TSs are not designed for accommodating client signals being propagated between virtual ports defined using Layer 2 Identifiers, such as a virtual local area network (VLAN).

Hence, TSs under the current standard can accommodate client signals in a unit of 1.25 Gbps at the minimum, and accordingly, client signals cannot be accommodated flexibly and efficiently, free from the limitation of the unit of 1.25 Gbps.

For example, a client signal in a band smaller than 1.25 Gbps cannot be accommodated and multiplied in an OTN frame.

SUMMARY (1) According to an aspect of the embodiments, a method includes a method of accommodating signals in a frame generation apparatus that generates a frame, the frame including a payload region in which a client signal is to be accommodated, and an overhead region accommodation location information indicating a location where the client signal is to be accommodated, the frame being able to be processed as an m (m is an integer equal to or greater than 2)-byte cycle multiframe, the method including: defining the location information as an m×n (n is an integer equal to or greater than 2)-byte cycle multiframe; defining, using the location information defined as the multiframe, the location where the client signal is to be accommodated in the payload region; and accommodating the client signal in the payload region, based on the defined location where the client signal is to be accommodated.

(2) According to an aspect of the embodiments, a method includes a method of accommodating signals in a frame generation apparatus that generates an optical channel payload unit (OPU) frame, the OPU frame including a payload region in which a client signal is to be accommodated, and an overhead region storing payload structure identifier (PSI) information indicating a location where the client signal is to be accommodated, the OPU frame being able to be processed as a 256-byte cycle multiframe, the method including: defining the PSI information as a 256×n (n is an integer equal to or greater than 2)-byte cycle multiframe; defining, using the PSI information defined as the multiframe, the location where the client signal is to be accommodated in the payload region; and accommodating the client signal in the payload region, based on the defined location where the client signal is to be accommodated.

(3) According to an aspect of the embodiments, an apparatus includes a frame generation apparatus that generates a frame, the frame including a payload region in which a client signal is to be accommodated, and an overhead region accommodation location information indicating a location where the client signal is to be accommodated, the frame being able to be processed as an m (m is an integer equal to or greater than 2)-byte cycle multiframe, the frame generation apparatus including: a location information defining section that defines the location information as an m×n (n is an integer equal to or greater than 2)-byte cycle multiframe; an accommodation location defining section that defines, using the location information defined by the location information defining section as the multiframe, the location where the client signal is to be accommodated in the payload region; and a frame generator that generates a frame by accommodating the client signal in the payload region, based on the location where the client signal is to be accommodated, defined by the accommodation location defining section.

(4) According to an aspect of the embodiments, an apparatus includes a frame generation apparatus that generates an optical channel payload unit (OPU) frame, the OPU frame including a payload region in which a client signal is to be accommodated, and an overhead region storing payload structure identifier (PSI) information indicating a location where the client signal is to be accommodated, the OPU frame being able to be processed as a 256-byte cycle multiframe, the frame generation apparatus including: a location information defining section that defines the PSI information as a 256×n (n is an integer equal to or greater than 2)-byte cycle multiframe; an accommodation location defining section that defines, using the PSI information defined by the location information defining section as the multiframe, the location where the client signal is to be accommodated in the payload region; and a frame generator that generates an OPU frame by accommodating the client signal in the payload region, based on the location where the client signal is to be accommodated, defined by the accommodation location defining section.

(5) According to an aspect of the embodiments, an apparatus includes a frame reception apparatus to be connected to the above-identified frame generation apparatus, the frame reception apparatus including: a receiver that receives a frame generated in the frame generation apparatus; and an extractor that extracts the client signal from the frame, based on location information indicating where the client signal is accommodated, the location information being included in the frame received by the receiver.

(6) According to an aspect of the embodiments, a system includes a transmission system including: the above-identified frame generation apparatus; and the above-identified frame reception apparatus, connected to the frame generation apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 7A to 7C are diagrams illustrating examples where a client signal is accommodated in an OTN frame in accordance with an embodiment;

FIGS. 8A and 8B are diagrams illustrating identification information for identifying an S-ODU;

FIGS. 9A and 9B are diagrams illustrating identification information for identifying an S-ODU;

FIGS. 10A and 10B are diagrams illustrating identification information for identifying an S-ODU;

FIG. 13 is a diagram illustrating an example of a TS management table;

FIG. 14 is a diagram illustrating an example of a TS management table;

FIGS. 22A and 22B are diagrams illustrating examples of a signaling method;

FIG. 26 is a diagram indicating an example of switching table possessed by a relay apparatus;

DESCRIPTION OF EMBODIMENTS

Hereunder is a description of embodiments with reference to the drawings. Note that the embodiment and examples described below are described by way of example only, and various modifications and applications of techniques that are not provided explicitly in the following embodiment and examples are not intended to be excluded. That is, the embodiment and examples described below can be modified in various ways (by combining configurations and functions, for example) without departing from the spirit thereof.

(1) Embodiment (1.1) Example of Configuration of Transmission System

Figure 1:
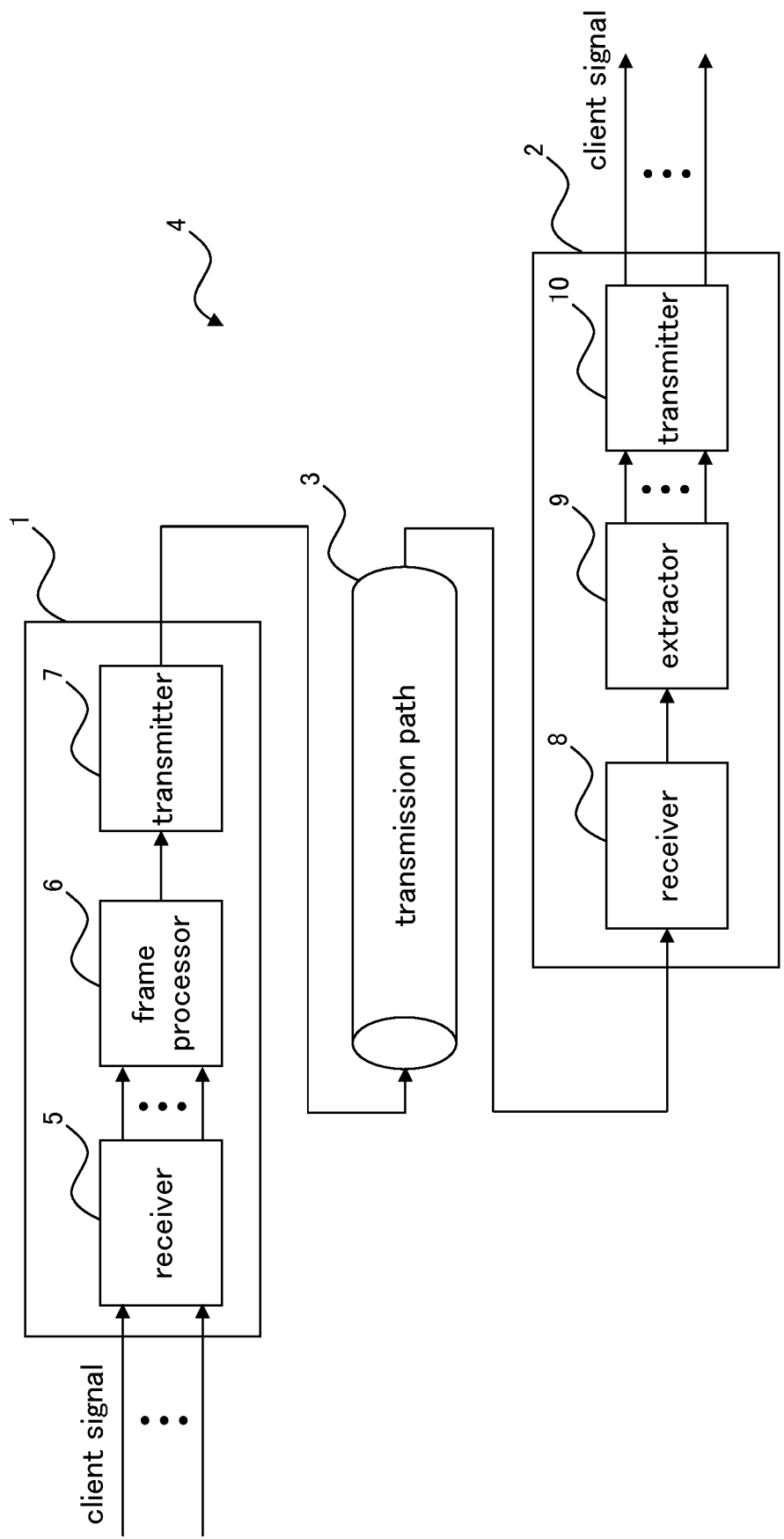
FIG. 1 is a diagram illustrating an example of the configuration of a transmission system in accordance with an embodiment.

FIG. 1 is a diagram illustrating an example of the configuration of a transmission system. The transmission system 4 depicted in FIG. 1 includes a transmission apparatus 1, a reception apparatus 2, and a transmission path 3.

The transmission apparatus 1 generates a frame by accommodating a client signal received from a client terminal, for example, into that frame. In other words, the transmission apparatus 1 functions as an example of a frame generation apparatus.

The frame includes OTN frames, such as an OPU frame, an ODU frame, and an OTU frame, as well as a frame including a payload region and an overhead region, for example. Hereinafter, although an embodiment and examples will be described with reference to OTN frames, such as an OPU frame, an ODU frame, and an OTU frame, it is not intended to exclude application of the embodiment and examples to other types of frames.

Specifically, the transmission apparatus 1 generates an OTN frame by accommodating a client signal into that OTN frame, and sends the generated OTN frame to the reception apparatus 2 through the transmission path 3. For that purpose, the transmission apparatus 1 includes a receiver 5, a frame processor 6, and a transmitter 7.

The receiver 5 receives a client signal input from a client terminal, for example. In other words, the receiver 5 has a function as an input interface that can connect a device, such as a client terminal, and the transmission apparatus 1.

Note that the client signal is a signal for providing a various types of services to a client terminal, for example, and includes, an SDH/SONET signal, an Ethernet® signal, a TDM signal, and an OTN frame.

The client signal received by the receiver 5 is transmitted to the frame processor 6.

The frame processor 6 executes predetermined frame processing on the client signal received by the receiver 5. For example, the frame processor 6 generates an OTU frame by accommodating the client signal into an OPU frame and accommodating or multiplying it to an ODU frame.

Note that an OTN frame includes an OPU frame, an ODU frame, an OTU frame, and the like, as described above, and may also include an optical channel data tributary unit (ODTU) and an optical channel data tributary unit group (ODTUG).

The OTN frame generated by the frame processor 6 is transmitted to the transmitter 7. Note that an example of the configuration and operation of the frame processor 6 will be described in detain in Section (1.4).

The transmitter 7 executes predetermined transmission processing on the OTN frame generated by the frame processor 6, and transmits the processed OTN frame to the transmission path 3. In other words, the transmitter 7 has a function as an output interface that can connect the transmission path and the transmitting apparatus 1 with each other.

Here, the transmission path 3 is a transmission medium which is provided between the transmission apparatus 1 and the reception apparatus 2, and through which the OTN frame sent from the transmission apparatus 1 is propagated to the reception apparatus 2. The transmission path 3 may include an optical fiber and a wireless transmission path, such as the free space, for example.

On the opposing side, the reception apparatus 2 receives the OTN frame sent from the transmission apparatus 1, and extracts a client signal from the received OTN frame. The client signal extracted from the OTN frame by the reception apparatus 2 may also be sent to a client terminal connected to the reception apparatus 2, for example. For that purpose, the reception apparatus 2 includes a receiver 8, an extractor 9, and a transmitter 10.

The receiver 8 receives the OTN frame sent from the transmission apparatus 1, and executes predetermined reception processing on the received OTN frame. In other words, the receiver 8 has a function as an input interface that can connect the transmission path and the reception apparatus 2 with each other. The OTN frame received by the receiver 8 is transmitted to the extractor 9.

The extractor 9 extracts the client signal from the OTN frame received by the receiver 8. The client signal extracted by the extractor 9 is transmitted to the transmitter 10. Note that an example of the operation of the extractor 9 will be described in Section (1.5).

The transmitter 10 can send the client signal extracted by the extractor 9 to a client terminal connected to the reception apparatus 2, for example. In other words, the transmitter 10 has a function as an output interface that can connect a device, such as a client terminal, and the reception apparatus 2, with each other.

(1.2) Example of Structure of OTN Frame

Figure 2:
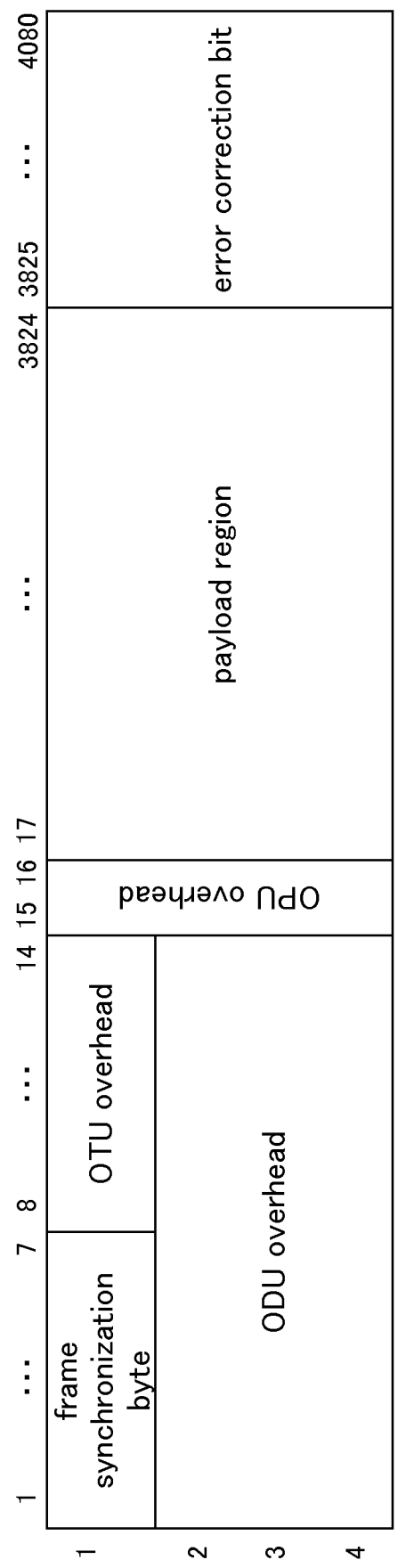
FIG. 2 is a diagram illustrating an example of an OTN frame.

Next, the structure of an OTN frame will be explained with reference to FIG. 2. FIG. 2 is a diagram illustrating an example of an OTU frame, which is one type of OTN frames.

As depicted in FIG. 2, an OTU frame has a frame size of four rows by 4080 columns, i.e., 16320 bytes. The $1^{st}$ to $16^{th}$ columns in the OTU frame represent an overhead region, and the $17^{th}$ to $3824^{th}$ columns represent a payload region, and the $3825^{th}$ to $4080^{th}$ columns represent an error correction bit region.

The overhead region in the OTN frame stores a various types of information used for connections and signal quality management between communication apparatuses, such as the transmission apparatus 1 and the reception apparatus 2.

In the example depicted in FIG. 2, the $1^{st}$ row and the $1^{st}$ to $7^{th}$ columns in the OTU frame store a frame synchronization byte, the $1^{st}$ row and the $8^{th}$ to $14^{th}$ columns store an OTU overhead, the $2^{nd}$ to $4^{th}$ rows and the $1^{st}$ to $14^{th}$ columns store an ODU overhead. The $1^{st}$ to $4^{th}$ rows and the $15^{th}$ to $16^{th}$ columns in the OTU frame store an OPU overhead.

The OTU overhead, the ODU overhead, and the OPU overhead are information for controlling the OTU frame, the ODU frame, and the OPU frame, respectively.

Here, the 1st row and the 7th column in the OTU frame, in other words, the last position of the frame synchronization byte stores a multiframe alignment signal (MFAS) used for multiframe processing.

The value of the MFAS is incremented for every frame. The MFAS provides the count of frames, enabling generation of a multiframe made from multiple frames. Stated differently, the MFAS indicate the sequence number of each frames included in a multiframe.

If the MFAS can be counted up to m (m is an integer equal to or greater than 2), for example, a multiframe in a unit of m frames can be made. In other words, an OTN frame is a frame which can be processed as an m-byte cycle multiframe.

The payload region in the OTN frame accommodates a client signal. As described above, client signals include a wide variety of signals, such as an SDH/SONET signal, an Ethernet® signal, a time division multiplexing (TDM) signal. Further, in the present example, client signals may have a band smaller than 1.25 Gbps, for example.

The error correction bit region stores error correction bits for correcting an error which may arise during propagation of the OTU frame. The error correction bits may include parity bits and hamming codes, for example. Note that the technique wherein an error is corrected by attaching, in advance, error correction bits to data to be transmitted, is referred to as forward error correction (FEC).

Note that the unit made from a payload region and an OPU overhead is referred to as an OPU frame, whereas the unit made from an OPU frame and an ODU overhead is referred to as an ODU frame. In other words, an ODU frame is accommodated in an OTU frame, which, in turn, accommodates an OPU frame.

Further, as OPU frames, an OPU0 and an OPU flex that accommodate client signals in the 1.239 Gbps band, an OPU1 that accommodates client signals in the 2.488 Gbps band, an OPU2 that accommodates client signals in the 9.995 Gbps band, an OPU 3 that accommodates client signals in the 40.150 Gbps band, and an OPU4 that accommodates client signals in the 104.356 Gbps band are stipulated.

For these OPUk (k=0, flex, 1, 2, 3, 4) frames, ODUk frames, OTUk frames, and the like are also stipulated.

For each of the frames described above, the ITU-T stipulates techniques for multiplying and mapping multiple frames.

Figure 3A:
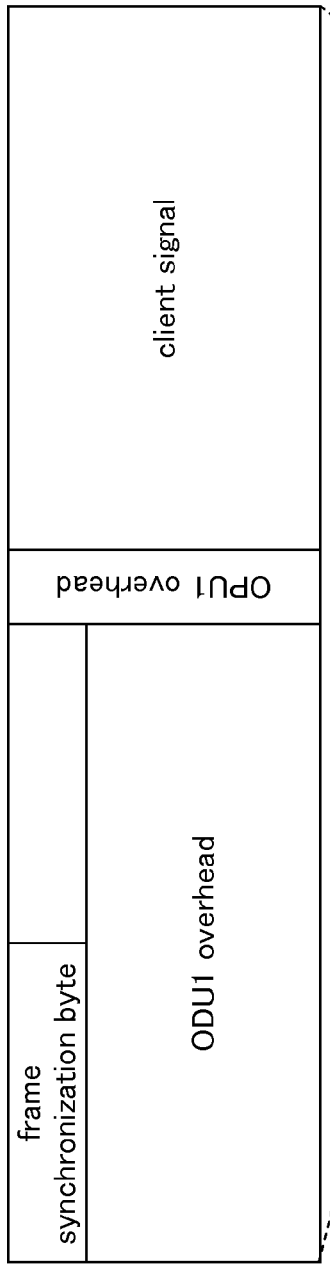
FIGS. 3A to 3C are diagrams illustrating examples where a client signal is accommodated in an OTN frame.
Figure 3B:
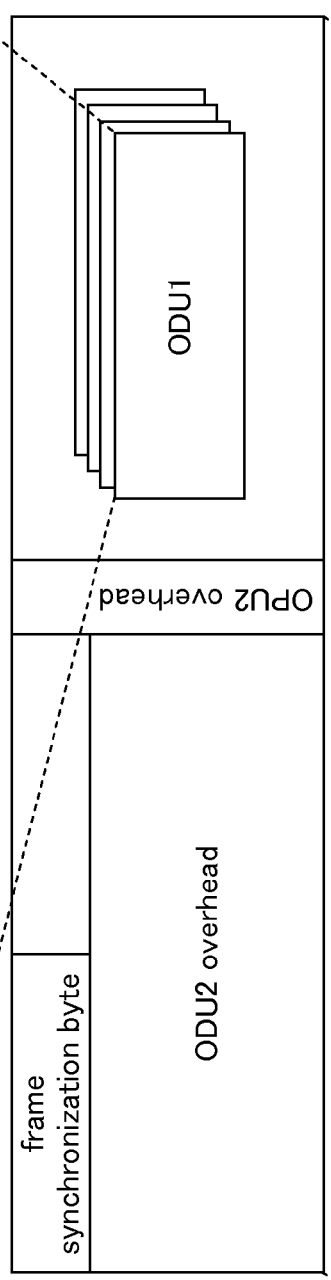
Figure 3C:
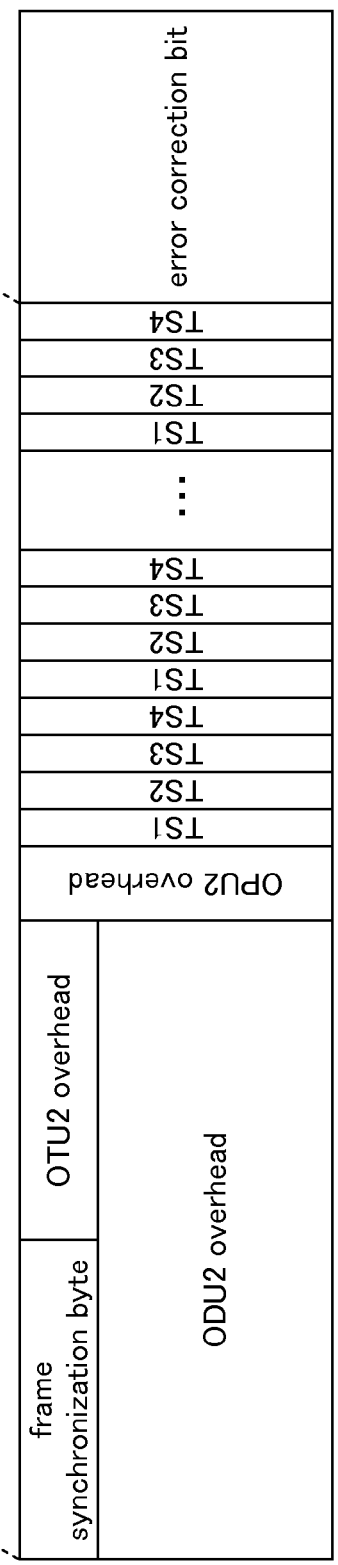

An example of techniques for multiplying and mapping OTN frames are depicted in FIG. 3A to FIG. 3C.

Firstly, as depicted in FIG. 3A, a client signal is accommodated in a payload region of an OPU1 frame made from an OPU1 overhead and the payload region.

Then, an ODU1 frame is generated by attaching a frame synchronization byte and an ODU1 overhead to the OPU1 frame. Since this ODU1 frame does not contain other ODU frames, the ODU1 frame is also referred to as a lower-order (LO) ODU frame.

Next, as depicted in FIG. 3B, the ODU1 frame depicted in FIG. 3A is multiplied by four times to a payload region in an OPU2 frame made from an OPU2 overhead and the payload region.

An ODU2 frame is generated by attaching a frame synchronization byte and an ODU2 overhead to the OPU2 frame. Since the OPU2 frame depicted in FIG. 3B includes another OPU frame, the OPU2 frame is also referred to as a higher-order (HO) OPU frame. Similarly, since the ODU2 frame depicted in FIG. 3B includes another ODU frame, the ODU2 frame is also referred to as a higher-order (HO) ODU frame.

Then, as depicted in FIG. 3C, an OTU2 frame is generated by attaching an OTU2 overhead and error correction bits to the ODU2 frame depicted in FIG. 3B.

Here, as depicted in FIG. 3C, the client signal is accommodated in a tributary slot (TS) in the payload region.

For example, if four types of TSs (TS1 to TS4) are used, the band allocated to each TS is about 2.5 Gbps, which is a value obtained by dividing about 10 Gbps, which is the band that can be carried in the payload region in the OPU2 frame, by four.

Alternatively, if eight types of TSs (TS1 to TS8) are used, the band allocated to each TS is about 1.25 Gbps, which is a value obtained by dividing about 10 Gbps, which is the band that can be carried in the payload region in the OPU2 frame, by eight.

In this manner, since an OTN frame is premised to accommodate a Gigabit Ethernet® signal, TSs having a band equal to or greater than 1.25 Gbps are still employed.

Hence, a signal propagating between virtual ports stipulated for a VLAN may not be efficiently accommodated into an OTN frame, for example. In addition, a client signal in a band smaller than 1.25 Gbps may not be efficiently accommodated in an OTN frame.

(1.3) Method of Accommodating Client Signal

As an example of a method of accommodating a client signal in a frame and transmitting the frame, a method is conceived of in which a client signal is mapped to a frame-mapped generic framing procedure (GFP-F), which is then accommodated to an OTN frame for transmission.

However, since an OTN frame can support only 256 channels at the maximum, channels for the OTN frames are depleted when the number of VLAN ports (the number of VLAN IDs) of the client signal are greater than 256, for example. Note that the upper limit of the number of VLAN IDs is 4096.

In addition, since the Channel ID defining the number of channels in an OTN frame is merely optional, in some cases, no channel may be available in OTN frame.

Further, since the frame length is set to any value in the above-described method, a header error check (HEC) processing is required for generating a GFP-F, which results in an increased processing load.

Additionally, since signals propagating between virtual ports stipulated by a Layer 2 Identifier, such as a VLAN, are randomly accommodated in an OPU frame, signal identification cannot be done for each virtual port. Hence, band assurance processing, such as the committed information rate (CIR) and the excess information rate (EIR) are not available, and warning information cannot be transferred for each virtual port.

Accordingly, the above-described method may not be able to assure user connectivity and the like.

Hence, in the present example, a client signal is flexibly and efficiently accommodated into a frame using the method which will be described below, for example. Further, the method enables control information, such as a warning transfer, to be sent and received, and enables band assurance processing.

(1.4) Configuration and Example of Operation of Frame Processor 6

The frame processor 6 in the present example accommodates a client signal in a band smaller than 1.25 Gbps, for example, into a frame flexibly and efficiently.

Figure 4:
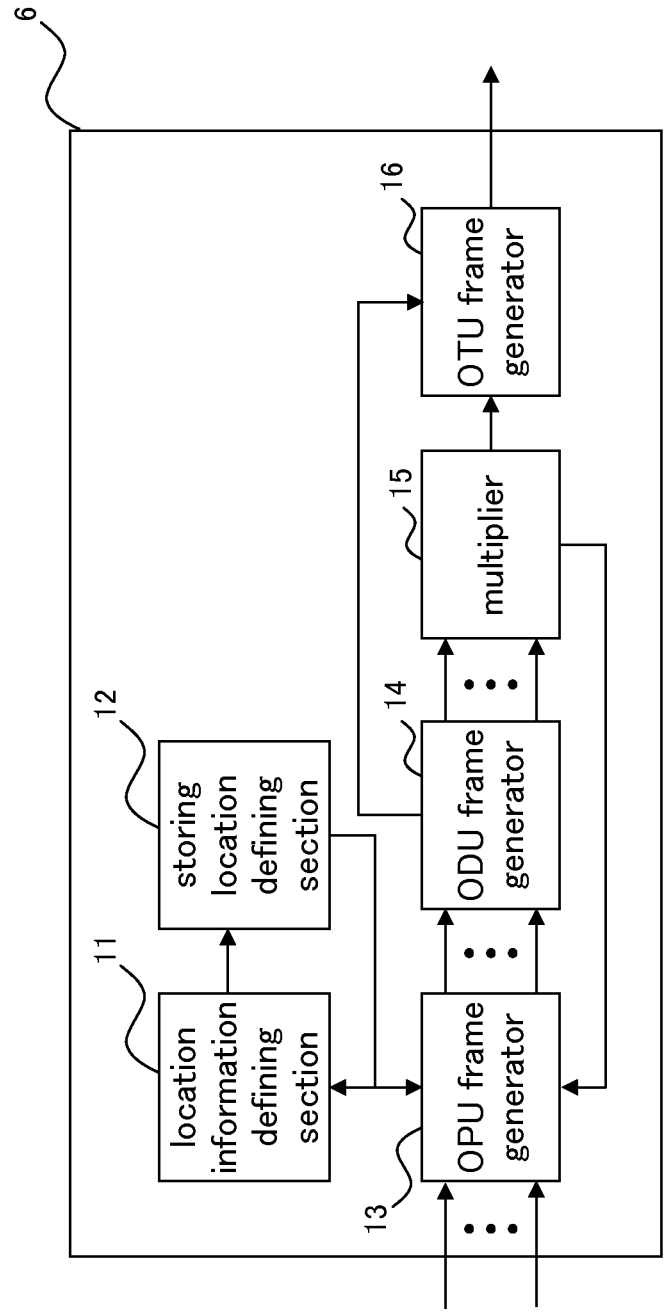
FIG. 4 is a diagram illustrating an example of the configuration of a frame processor depicted in FIG. 1.

For that purpose, as illustrated in FIG. 4, the frame processor 6 includes a location information defining section 11, an accommodation location defining section 12, an OPU frame generator 13, an ODU frame generator 14, a multiplier 15, and an OTU frame generator 16.

The location information defining section 11 defines location information indicating the location where a client signal is to be accommodated in the payload region in a frame. For example, the location information defining section 11 defines the location information accommodated in the overhead region in a frame which is capable of being processed as an m-byte cycle multiframe, as a multiframe in one unit of m×n (n is an integer equal to or greater than 2) bytes (i.e., m×n-byte cycle). The case where n=1 corresponds to the standard stipulated by the ITU-T.

With reference to an OPU frame as an example, the payload structure identifier (PSI) accommodated in the overhead region in the OPU frame (hereinafter, referred to as PSI information) can be employed as the location information. Although the present example will be described with reference to the PSI as an example of location information, it is not intended to exclude other location information indicating the location where a client signal is to be accommodated in the payload region.

Figure 5A:
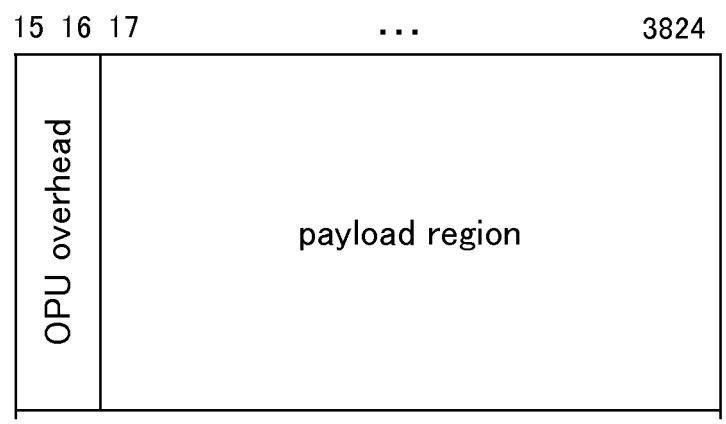
FIGS. 5A and 5B are diagrams illustrating examples of an OPU frame.
Figure 5B:
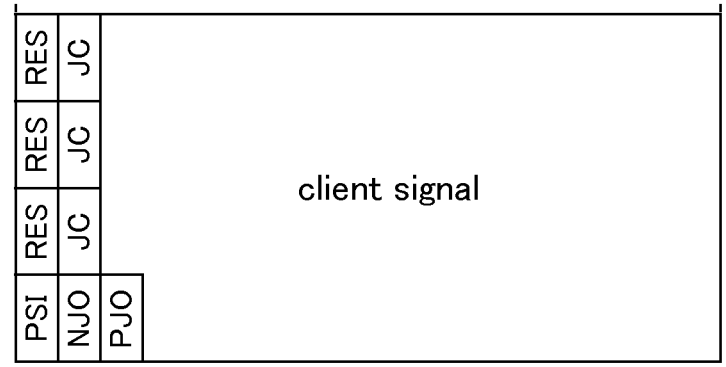

As depicted in FIG. 5A, the OPU frame includes an OPU overhead region and a payload region. Further, as depicted in FIG. 5B, the OPU overhead region stores the PSI, the undefined reserved for future international standardization (RES) (reserved region), the justification control for controlling stuffing, the positive justification opportunity (PJO) for positive stuffing, and the negative justification opportunity (NJO) for negative stuffing.

A detailed description of a stuffing control is not provided here. A positive or negative stuffing control is carried out, depending on the difference of the bit rates, if the bit rate of the client signal does not match the bit rate of the payload region, for example. Thereby, client signals can be frequency-synchronized to achieve time division multiplexing of the multiple client signals, and the clock accuracy can be controlled within the clock accuracy stipulated in the OTN standard.

Here, the PSI information is information used for indicating what kind of signal is accommodated in the payload region, or indicating mapping information. Further, one byte is allocated for a PSI accommodated in the overhead region in each frame.

In the present example, the location information defining section 11 defines m×n frames as one multiframe, the PSI information is transmitted in a unit of m×n bytes.

By defining the PSI information as a multiframe structure of m×n bytes, the number of bits for defining TSs can be enhanced, and accordingly, the number of TSs can be increased. Since the client signal can be accommodated in TSs in a smaller unit by increasing the number of TSs, a flexible and efficient storage into a frame can be achieved.

Note that the value of m is typically 256 in an OTN frame. Hence, the present example will be described hereinafter with reference to an example where m=256.

The location information defining section 11 can define the PSI information s an m (=256)×n-byte cycle multiframe, and defines that as a 256×n-byte cycle multiframe n sub-multiframes, each having a length of 256 bytes, for example.

Figure 6:
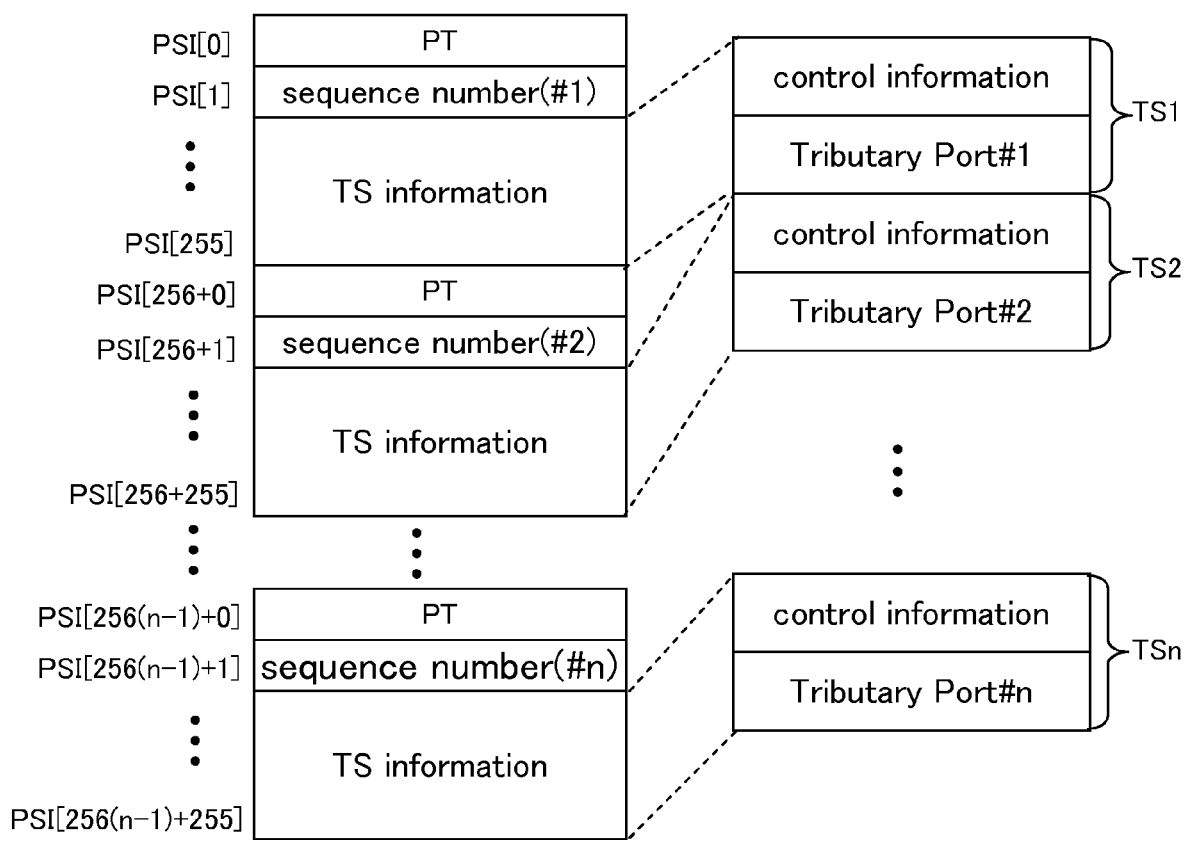
FIG. 6 is a diagram illustrating an example of the structure of a PSI in accordance with an embodiment.

FIG. 6 is a diagram indicating an example of the structure of PSI information structured as a 256×n-byte cycle multiframe. As depicted in FIG. 6, PSI information in the present example has a {256 (n−1)+255}-byte multiframe structure made from {256 (n−1)+255} frames in total. Further, this multiframe includes n sub-multiframes each having a size of 256 bytes.

Further, the location information defining section 11 may store a payload type (PT) byte in the first byte in each sub-multiframe {PSI [0], PSI [256+0], ..., PSI [256 (n−1)+0]}. The PT byte is the information indicating the type or structure of a client signal accommodated in the payload region in the OPU frame. Note that the PT byte may be the information indicating a start position of each sub-multiframe.

Further, the location information defining section 11 may store the sequence number (#1 to #n) in the second byte in each sub-multiframe {PSI [1], PSI [256+1], ..., PSI [256 (n−1)+1]}.

Referring back to FIG. 4, the accommodation location defining section 12 defines the location where a client signal is to be stored in the payload region, using the PSI information defined by the location information defining section 11, as a 256×n-byte multiframe.

For example, the accommodation location defining section 12 can store the TS information, which is the storage information on where the client signal is located in the payload region, in the n sub-multiframes described above. Note that the TS information may have a length of one byte or longer, allocated thereto.

As depicted in FIG. 6, the TS information is stored in the $3^{rd}$ to $256^{th}$ bytes in each sub-multiframe {PSI [2] to PSI [255], PSI [258] to PSI [511], ..., PSI [256(n−1)+2] to PSI [256(n−1)+255]}, for example.

The TS information each has tributary port information indicating where a TS is located in the payload region (Tributary Port #1 to Tributary Port #n), and control information on a client signal accommodated in each of the TSs, for example. The control information may include an allocation flag indicating whether a client signal is allocated in the TS, information used for warning transfer for the client signal, band information, and the like, for example.

As described above, since the number of TSs can be increased in the payload region in the present example, TSs can be defined in a smaller unit (can be defined with a band smaller than 1.25 Gbps, for example), adaptively to the band of a client signal. Thereby, a client signal in a band smaller than 1.25 Gbps, for example, can be accommodated into a frame flexibly and efficiently.

In addition, since PSI information in the present example can contain control information on a client signal, services, such as warning transfer and band assurance processing, can be provided for each client signal.

In other words, in the present example, warning transfer processing for a client signal can be carried out for each TS by managing a VLAN instance in a unit of TS, and hence the processing load of the hardware for the warning transfer processing can be reduced.

Referring back to FIG. 4, the OPU frame generator 13 accommodates a client signal from the receiver 8 in the payload region in the OPU frame, based on the location where the client signal is to be accommodated, defined by the accommodation location defining section 12.

The OPU frame generator 13 also generates an OPU frame by attaching a predetermined OPU overhead to the payload part having the above-described client signal accommodated therein. Hereinafter, an OPU frame including PSI information defined as an m×n bytes multiframe as described above may be referred to as a special (S)-OPU frame.

Further, the OPU frame generator 13 may generate a higher-order (HO) OPU frame by storing a multiplied frame generated by the multiplier 15, which will be described later, into the payload region in the OPU frame. Hereinafter, a higher-order (HO) OPU frame including multiple OPU frames each including PSI information defined as an m×n bytes multiframe as described above, may be referred to as an S-OPU frame.

Here, the technique for accommodating a client signal into a TS is not particularly limited, and a client signal may be accommodated by executing encoding processing, such as the 8B/10B conversion, on the client signal.

Specifically, the traffic is extracted for each VLAN on a client device, and a predetermined band restriction may be imposed, depending on the service requirement and the like, for example. Further, client signals may be accommodated in the respective TSs by adding an inter frame gap (IFG) and idle signals and executing encoding processing, such as the 8B/10B conversion.

The encoded client signals may be mapped to the respective TSs which construct a virtual Ethernet® port (interface sublayer) and have the closest band. In addition to the encoding as described above, mapping techniques, such as the GFP, may also be employed.

Further, the OPU frame generator 13 may determine whether or not the band of the client signal is equal to or greater than a predetermined band (e.g., 1.25 Gbps), and may generate OPU frames in different types, based on the result of the determination.

Specifically, the OPU frame generator 13 may generate an S-OPU frame if it is determined that the band of a client signal is lower than a predetermined band, whereas generating a general OPU frame if it is determined that the band of the client signal is equal to or higher than the predetermined band, for example. Here, a "general OPU frame" refers to an OPU frame including PSI information having a multiframe structure in a unit of 256 bytes.

This can provide a storing technique which is adaptive to the bands of client signals, in which a client signal in a band smaller than the predetermined band is accommodated in an S-ODU frame, whereas a client signal in a band equal to or higher than the predetermined band is accommodated in an ODU frame.

The S-OPU frame generated by the OPU frame generator 13 is transmitted to the ODU frame generator 14.

The ODU frame generator 14 generates an ODU frame by attaching a predetermined ODU overhead to an S-OPU frame generated by the OPU frame generator 13. Hereinafter, such an ODU frame may be referred to as an S-ODU frame.

The ODU frame generator 14 also generates a general ODU frame by attaching a predetermined ODU overhead to a general OPU frame generated by the OPU frame generator 13.

The S-ODU frame generated by the ODU frame generator 14 is transmitted to the multiplier 15 or the OTU frame generator 16.

The multiplier 15 generates a multiplied frame by multiplying an S-ODU frame or an ODU frame generated by the ODU frame generator 14. The undefined region in the overhead region in the multiplied frame may store identification information for identifying the S-ODU frame.

Here, an example of techniques for multiplying and mapping S-OPU and S-ODU frames are depicted in FIG. 7A to FIG. 7C.

Firstly, as depicted in FIG. 7A, an S-ODU1 frame is generated by attaching frame synchronization byte and an ODU1 overhead to an S-OPU1 frame that includes an S-OPU1 overhead storing PSI information constructing an m×n-byte cycle multiframe structure and a payload region storing TS1 to TSn. TS1 to TSn stored in the payload region in the S-ODU1 frame respectively accommodate client signals having the bands lower than 1.25 Gbps, for example.

Next, as depicted in FIG. 7B, the S-ODU1 frame depicted in FIG. 7A is accommodated in a payload region in an OPU2 frame made from an OPU2 overhead and the payload region. Note that the payload region in the OPU2 frame described above may accommodate a general ODU frame (ODU1 frame in FIG. 7B), as well as the S-ODU1 frame.

An ODU2 frame is further generated by attaching a frame synchronization byte and an ODU2 overhead to the OPU2 frame.

Then, as depicted in FIG. 7C, an OTU2 frame is generated by attaching an OTU2 overhead and error correction bits to the ODU2 frame depicted in FIG. 7B.

As described above, since the number of TSs can be enhanced in the payload region in the present example, a client signal can be accommodated into a frame flexibly and efficiently.

For example, if n types of TSs (TS1 to TSn) are used, the band allocated to each TS is a value obtained by dividing about 10 Gbps, which is the band that can be carried in the payload region in the OPU2 frame, by n. If n is 100, the band which can be allocated to each TS is about 100 Mbps.

In accordance with the present example, by setting the number of TSs in accordance with the band of a client signal, the client signal can be accommodated into a frame flexibly.

In addition, facilitating extraction of an S-ODU frame accommodated in an OTN frame on the receiving side, identification information for identifying the location where the S-ODU frame is accommodated may be stored in the overhead region of a higher-order ODU frame or an OTU frame.

For example, as depicted in FIG. 8A, PSI information stored in the overhead region in an ODU2 frame includes ODTU type information in the $1^{st}$ to $2^{nd}$ bits and tributary port information in the $3^{rd}$ to $8^{th}$ bits.

Here, as depicted in FIG. 8B, to ODTU type information, the value "00" is set for ODTU12, and the value "10" is set for ODTU2.ts. The value "01" represents a reserved region (Reserved), and the value "11" represents undefined (Unallocated).

Accordingly, the $1^{st}$ to $2^{nd}$ bits of PSI information corresponding to the TS storing an S-ODU can be indicated by "11", which indicates an undefined region. Thereby, the reception apparatus 2 can recognize that an S-ODU frame is accommodated in the TS corresponding to the PSI information having the value "11" in the $1^{st}$ to $2^{nd}$ bits.

Further, as depicted in FIG. 8B, all of the $1^{st}$ to $3^{rd}$ bits of the tributary port information (i.e., the $3^{rd}$ to $5^{th}$ bits of the PSI information) are zero.

Hence, by setting the value "1" to at least one of the $3^{rd}$ to $5^{th}$ bits of the PSI information corresponding to the TS storing the S-ODU, the presence of the S-ODU frame can be indicated. Thereby, the reception apparatus 2 can recognize that an S-ODU frame is accommodated in the TS corresponding to the PSI information having the value "0" in at least one of the $3^{rd}$ to $5^{th}$ bits.

Note that the undefined region in the ODTU type information and the undefined region in the tributary port information may be combined.

Further, for example, as depicted in FIG. 9A, PSI information stored in the overhead region in an ODU3 frame includes ODTU type information in the $1^{st}$ to $2^{nd}$ bits and tributary port information in the $3^{rd}$ to $8^{th}$ bits, as in the case of an ODU2 frame.

Here, as depicted in FIG. 9B, to ODTU type information, the value "00" is set for ODTU13, the value "01" is set for ODTU23, and the value "10" is set for ODTU3.ts. The value "11" represents undefined (Unallocated).

Accordingly, the $1^{st}$ to $2^{nd}$ bits of PSI information corresponding to the TS storing an S-ODU can be indicated by "11", which represents an undefined region. Thereby, the reception apparatus 2 can recognize that an S-ODU frame is accommodated in the TS corresponding to the PSI information having the value "11" in the $1^{st}$ to $2^{nd}$ bits.

Further, as depicted in FIG. 9B, the $1^{st}$ bit of the tributary port information (i.e., the $3^{rd}$ bit of the PSI information) is zero.

Hence, by setting the value "1" to the $3^{rd}$ bit of the PSI information corresponding to the TS storing the S-ODU, the presence of the S-ODU frame can be indicated. Thereby, the reception apparatus 2 can recognize that an S-ODU frame is accommodated in the TS corresponding to the PSI information having the value "1" in at least one of the $3^{rd}$ to $5^{th}$ bits.

Note that the undefined region in the ODTU type information and the undefined region in the tributary port information may be combined. Although FIG. 8A, FIG. 8B, FIG. 9A, and FIG. 9B indicate examples of the structure of PSI information when PT=21, similarly for other PTs, identification information for an S-ODU frame may be indicated using the undefined region in the PSI information and the like.

For example, for OTU4, ODU4, and OPU4 frames, the OPU4 multiframe identifier (OMFI) stored in an overhead region in an OPU4 frame, may be used.

As depicted in FIG. 10A, in an OMFI, the $1^{st}$ bit is fixed to zero, and the value is incremented in the $2^{nd}$ to $8^{th}$ bits. Accordingly, it is possible to make the reception apparatus 2 recognize the presence of the S-ODU frame by setting the value "1" to the $1^{st}$ bit in the OMFI.

For OTU1, ODU1, and OPU1 frames, the OMFI may be used for identification information for an S-ODU frame. Alternatively, for example, as depicted in FIG. 10B, the identification information for an S-ODU frame may be set by setting "1" to at least one of the $3^{rd}$ to $7^{th}$ bits in the PSI information (i.e., the $1^{st}$ to $5^{th}$ bits in the tributary port information) in an OPU1 frame.

Referring back to FIG. 4, the multiplied frame generated by the multiplier 15 is transmitted to the OTU frame generator 16 or the OPU frame generator 13.

The OTU frame generator 16 generates an OTU frame by attaching a predetermined OTU overhead to an ODU frame generated by the ODU frame generator 14 or a multiplied frame generated by the multiplier 15. The OTU frame generated by the OTU frame generator 16 is transmitted to the transmitter 7.

As described above, in the present example, the number of bits which can be allocated for information for defining TSs may be enhanced by defining the PSI information with an m×n-byte multiframe structure.

Thereby, since the number of TSs can be increased in the payload region, it becomes possible to define the band which can be accommodated in a TS in a smaller unit (a band smaller than 1.25 Gbps, for example).

In this manner, in accordance with the present example, a client signal having a bit rate lower than 1.25 Gbps can be accommodated into a frame flexibly and efficiently.

In addition, since control information on a client signal can be defined, services, such as warning transfer and band assurance processing, can be provided for each client signal.

In other words, in the present example, since a warning transfer for a client signal can be carried out for each TS by managing a VLAN instance in a unit of TS, the processing load of the hardware for the warning transfer processing can be reduced.

(1.5) Example of Operation of Extractor 9

On the opposing side, in the reception apparatus 2, the extractor 9 extracts a client signal from a frame, based on the location information indicating the location where a client signal is to be accommodated, included in the frame received by the receiver 8.

For example, the extractor 9 identifies an S-ODU frame, based on the identification information, as described above, included in the overhead region in an OTU frame or an ODU frame. Then, the extractor 9 extracts a client signal from a TS stored in the payload region in the S-ODU frame, based on PSI information defined in an m×n-byte cycle multiframe structure, included in the overhead region in the S-ODU frame.

In this manner, the reception apparatus 2 can extract an S-OPU frame included in the OTU frame in a liable manner, based on the identification information as described above.

(2) First Example

Figure 11:
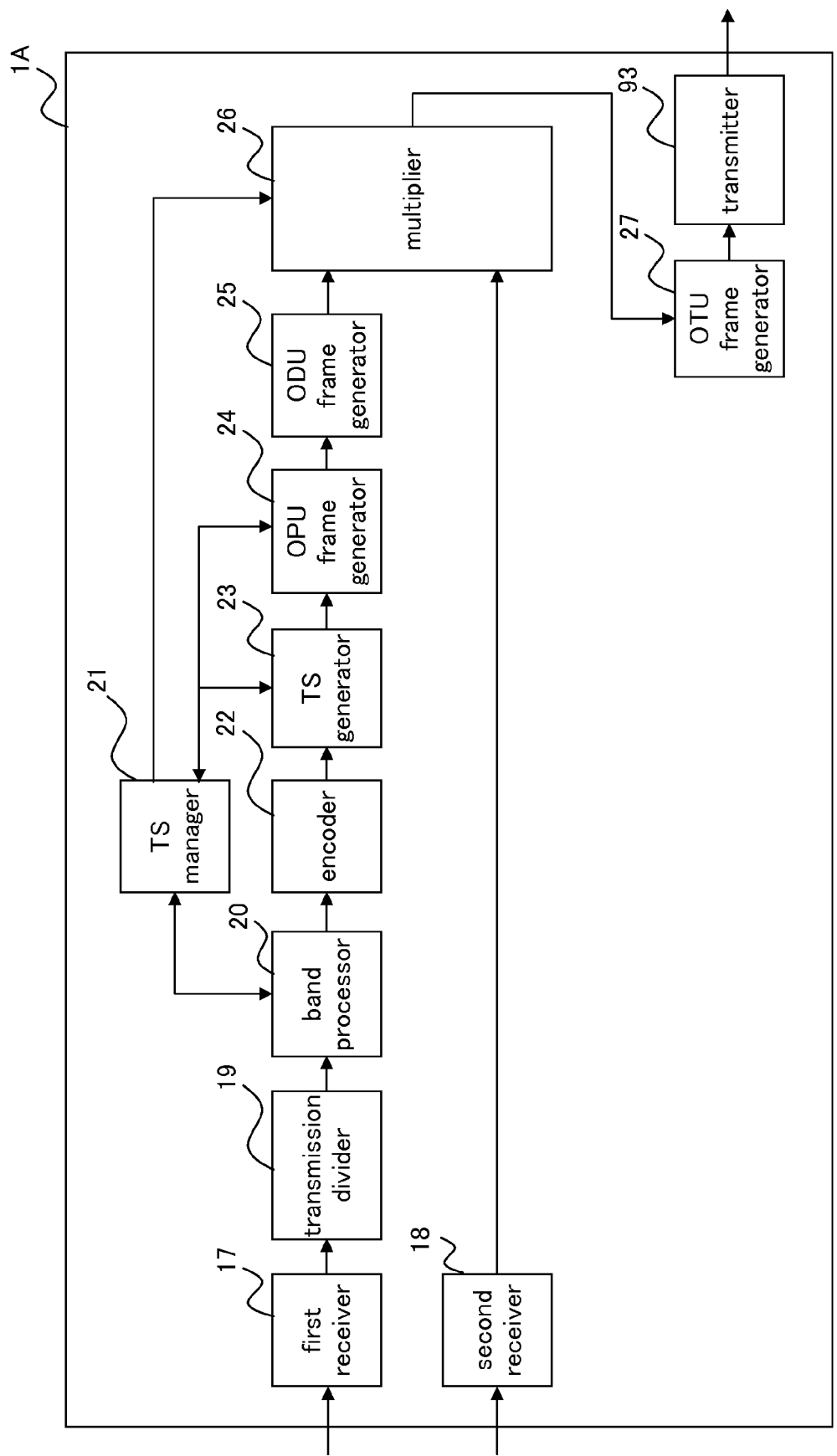
FIG. 11 is a diagram illustrating an example of the configuration of a transmission apparatus in accordance with a first example.

Here, an example of the configuration of a transmission apparatus 1A in accordance with a first example is depicted in FIG. 11. As depicted in FIG. 11, the transmission apparatus 1A includes a first receiver 17, a second receiver 18, a transmission divider 19, a band processor 20, a TS manager 21, an encoder 22, and a TS generator 23, for example. The transmission apparatus 1A also includes an OPU frame generator 24, an ODU frame generator 25, a multiplier 26, an OTU frame generator 27, and a transmitter 93, for example.

Here, the first receiver 17 receives a client signal input to the transmission apparatus 1A. A client signal received by the first receiver 17 may be an Ethernet® signal in a band smaller than 1.25 Gbps, for example. In other words, the first receiver 17 has a function as a Ethernet® port which can receive a traffic propagating through the Ethernet® as a transmission medium on a port by port basis. The first receiver 17 may be configured physically to have multiple reception ports.

The client signal received by the first receiver 17 is transmitted to the transmission divider 19. Note that the client signal is a signal for providing a various types of services to the client terminal, for example, and includes, an SDH/SONET signal, an Ethernet® signal, and a TDM signal.

The second receiver 18 receives a traffic input to the transmission apparatus 1A. The traffic received by the second receiver 18 includes traffics, such as an optical channel (och) input through an optical transmission path and an OTU frame, example. In other words, the second receiver 18 has a function as an OTN port that can receive an OTN frame. The second receiver 18 may be configured physically to have multiple reception ports.

Further, the second receiver 18 extracts an ODU frame by executing predetermined reception processing on the received OTU frame, and transmits the extracted ODU frame to the ODU frame second generator 26. Note that the predetermined reception processing may include OTU processing based on the OTU overhead and FEC processing, for example.

In other words, the first receiver 17 and the second receiver 18 function as an example of the receiver 5 in accordance with an embodiment described above.

The transmission divider 19 separates the client signal received by the first receiver 17 for each VLAN ID, for example. Specifically, the transmission divider 19 has a function to separate traffic, such as an Ethernet® signal, for each VLAN. The traffics separated by the transmission divider 19 are transmitted to the band processor 20.

The band processor 20 executes predetermined band processing on the traffics separated at the transmission divider 19. For example, the band processor 20 can restrict the band of the traffics, to the band depending on the number of TSs (n) determined by the TS manager 21. For example, the band processor 20 may restrict the band of the traffics, based on the band allocated for each TS. Alternatively, the CIR or the EIR may be determined, based on the band allocated for each TS.

Thereby, the transmission apparatus 1A can accommodate a client signal in a region in the payload region, which varies depending on a band to be assured for the client signal.

The TS manager 21 defines PSI information in an OPU frame as an m×n bytes multiframe, and defines the location where a client signal is to be accommodated in the payload region using the PSI information. In other words, the TS manager 21 functions as an example of the location information defining section 11 and the accommodation location defining section 12 described above.

Figure 14:
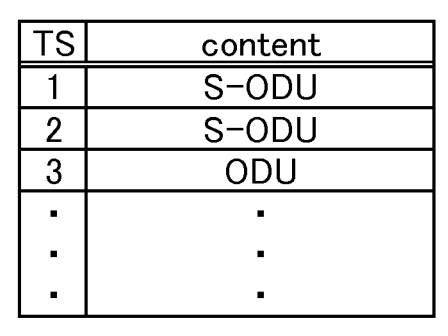

Specifically, the TS manager 21 determines how the traffics are allocated to TSs, using a TS management table depicted in FIG. 13 and FIG. 14, for example.

A first TS management table depicted in FIG. 13 retains information on the definition of the services for the traffics, information on the sum of the service band, and information on TS allocation, while relating them with each other.

The example depicted in FIG. 13 indicates that, when the VLAN ID is "X" and the sum of traffics received by Port A has a service band of P Mbps, these traffics are to be allocated to multiplied frames TS #1, TS #a, . . . .

Similarly, when the VLAN ID is "Y" and the sum of traffics received by Port B has a service band of Q Mbps, these traffics are to be allocated to multiplied frames TS #b, TS #d, . . . . When the sum of traffics received by Ports C and D has a service band of 2 Mbps, these traffics are to be allocated to multiplied frames TS #j, TS #k, . . . . In this manner, for traffics received by multiple reception ports, the traffic received by each reception port may be multiplies and allocated to TSs.

A second TS management table depicted in FIG. 14 indicates TSs included in the multiplied frame are occupied what types of signals. The second TS management table may be generated by the TS manager 21, based on the contents in the "TS allocation" field in the first TS management table, for example. The example depicted in FIG. 14 indicates that S-ODU frames are accommodated in multiplied frame TS1 and TS2, and that an ODU frame is accommodated in TS3.

Note that contents in the TS management tables described above are notified to the TS generator 23, the OPU frame generator 24, and the multiplier 26. Further, the contents in the TS management tables may be notified to the reception apparatus 2A, or a system administrator or the like may create similar tables in the reception apparatus 2A.

The encoder 22 executes predetermined encode processing, such as the 8B/10B conversion, for example, on the traffics from the band processor 20. Note that such predetermined encode processing may include inclusion of an IFG or idle signals, for example. The traffics that undergo the predetermined encode processing by the encoder 22 are transmitted to the TS generator 23.

The TS generator 23 generates TSs for storing the traffic. For example, the TS generator 23 may generate TSs, based on the number of TSs determined by the TS manager 21.

The OPU frame generator 24 generates an S-OPU frame, by storing the traffics into the TSs generated by the TS generator 23, storing the TSs into a payload region, and then attaching an OPU overhead to that payload. The S-OPU frame generated by the OPU frame generator 24 is transmitted to the ODU frame generator 25.

The ODU frame generator 25 generates an ODU frame by storing the S-OPU frame generated by the OPU frame generator 24 to a payload, and further attaching an ODU overhead. The S-ODU frame generated by the ODU frame generator 25 is transmitted to the multiplier 26.

The multiplier 26 generate a multiplied frame by multiplying the S-ODU frame input from the ODU frame generator 25, and the ODU frame input from the second receiver 18.

The multiplier 26 can also store identification information for identifying the location of the S-ODU frame in the payload region in the generated multiplied frame, in an undefined region in the overhead region the multiplied frame. The multiplied frame generated by the multiplier 26 is transmitted to the OTU frame generator 27.

The OTU frame generator 27 generates an OTU frame by attaching an OTU overhead and error correction code to the multiplied frame generated by the multiplier 26.

In other words, the transmission divider 19, the band processor 20, the TS manager 21, the encoder 22, the TS generator 23, the OPU frame generator 24, the ODU frame generator 25, the multiplier 26, and the OTU frame generator 27 function as an example of the frame processor 6 in accordance with an embodiment.

The transmitter 93 sends the OTU frame generated by the OTU frame generator 27 to the reception apparatus 2A through an optical transmission path.

In other words, the transmitter 93 functions as an example of the transmitter 7 in accordance with an embodiment.

Figure 12:
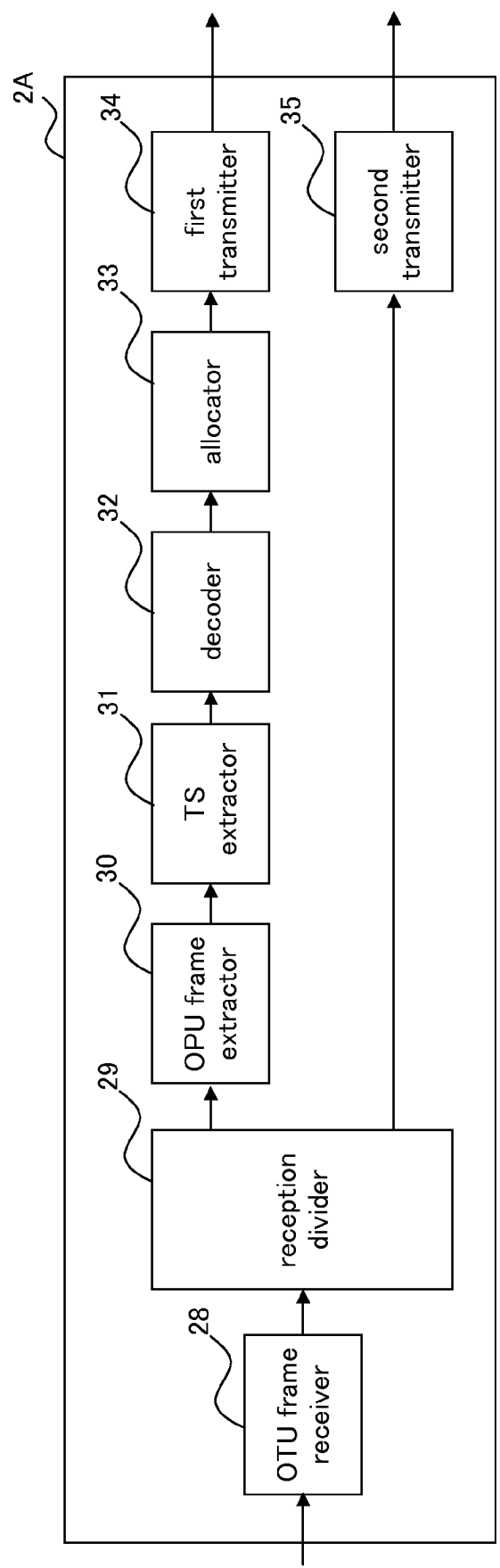
FIG. 12 is a diagram illustrating an example of the configuration of a reception apparatus in accordance with the first example.

Next, an example of the configuration of the reception apparatus 2A in accordance with the first example is depicted in FIG. 12. As depicted in FIG. 12, the reception apparatus 2A includes an OTU frame receiver 28, a reception divider 29, an OPU frame extractor 30, a TS extractor 31, a decoder 32, an allocator 33, a first transmitter 34, and a second transmitter 35, for example.

Here, the OTU frame receiver 28 receives an OTU frame sent from the transmission apparatus 1A. The OTU frame receiver 28 also extracts a multiplied frame by executing predetermined reception processing on the received OTU frame. The extracted multiplied frame is transmitted to the reception divider 29.

In other words, the OTU frame receiver 28 functions as an example of the receiver 8 in accordance with an embodiment.

The reception divider 29 extracts and separates an S-ODU frame and an ODU frame from the multiplied frame input from the OTU frame receiver 28. For example, the reception divider 29 extracts an S-ODU frame based on identification information included in the overhead region in the multiplied frame, and transmits the S-ODU to the OPU frame extractor 30. The reception divider 29 also extracts an ODU frame and transmits the ODU frame to the second transmitter 35.

The OPU frame extractor 30 extracts an S-OPU frame from the S-ODU frame input from the reception divider 29. The S-OPU frame extracted by the OPU frame extractor 30 is transmitted to the TS extractor 31.

The TS extractor 31 extracts a client signal from a TS stored in the payload region in the S-OPU frame extracted by the OPU frame extractor 30. For example, the TS extractor 31 can extract a client signal from a payload region in the S-OPU frame, based on PSI information defined in an m×n-byte cycle multiframe structure, included in the overhead region in the S-OPU frame. The client signal extracted by the TS extractor 31 is transmitted to the decoder 32.

The decoder 32 executes predetermined decode processing on the client signal extracted by the TS extractor 31. For example, if the encode processing by the encoder 22 includes inclusion of an IFG, idle signals, or the like, the decoder 32 may remove the IFG or the idle signals. The client signal that undergoes the predetermined decode processing by the decoder 32 is transmitted to the allocator 33.

The allocator 33 sends client signals that undergo the decode processing by the decoder 32 to the respective transmission ports. For example, the allocator 33 determines to which the transmission port a client signal is to be sent, based on the VLAN ID included in the client signal.

In other words, the reception divider 29, the OPU frame extractor 30, the TS extractor 31, the decoder 32, and the allocator 33 function as an example of the extractor 9 in accordance with an embodiment.

The first transmitter 34 executes predetermined transmission processing on the client signal input from the allocator 33. The client signal that undergoes the predetermined transmission processing by the first transmitter 34 is sent to a client device or the like. For that purpose, the first transmitter 34 may include at least one transmission port corresponding to the client device(s).

The second transmitter 35 executes predetermined transmission processing on the ODU frame input from the divider 29. The predetermined transmission processing by the second transmitter 35 sends the client signal to a client terminal, and sends an OTU frame to the optical transmission path, for example. That is, the predetermined transmission processing executed by the second transmitter 35 includes processing for extracting the client signal, and for generating an OTU frame. Note that the second transmitter 35 may include at least one transmission port corresponding to the destination client device(s) and/or optical transmission path.

In other words, the first transmitter 34 and the second transmitter 35 function as an example of the transmitter 10 in accordance with an embodiment.

As described above, in accordance with the present example, since a client signal can be accommodated in a region in the payload region, which varies depending on the band to be assured, for transmission, as well as the advantageous effects achieved by the above-described embodiment, frames can be accommodated more flexibly.

(3) Second Example

Figure 15:
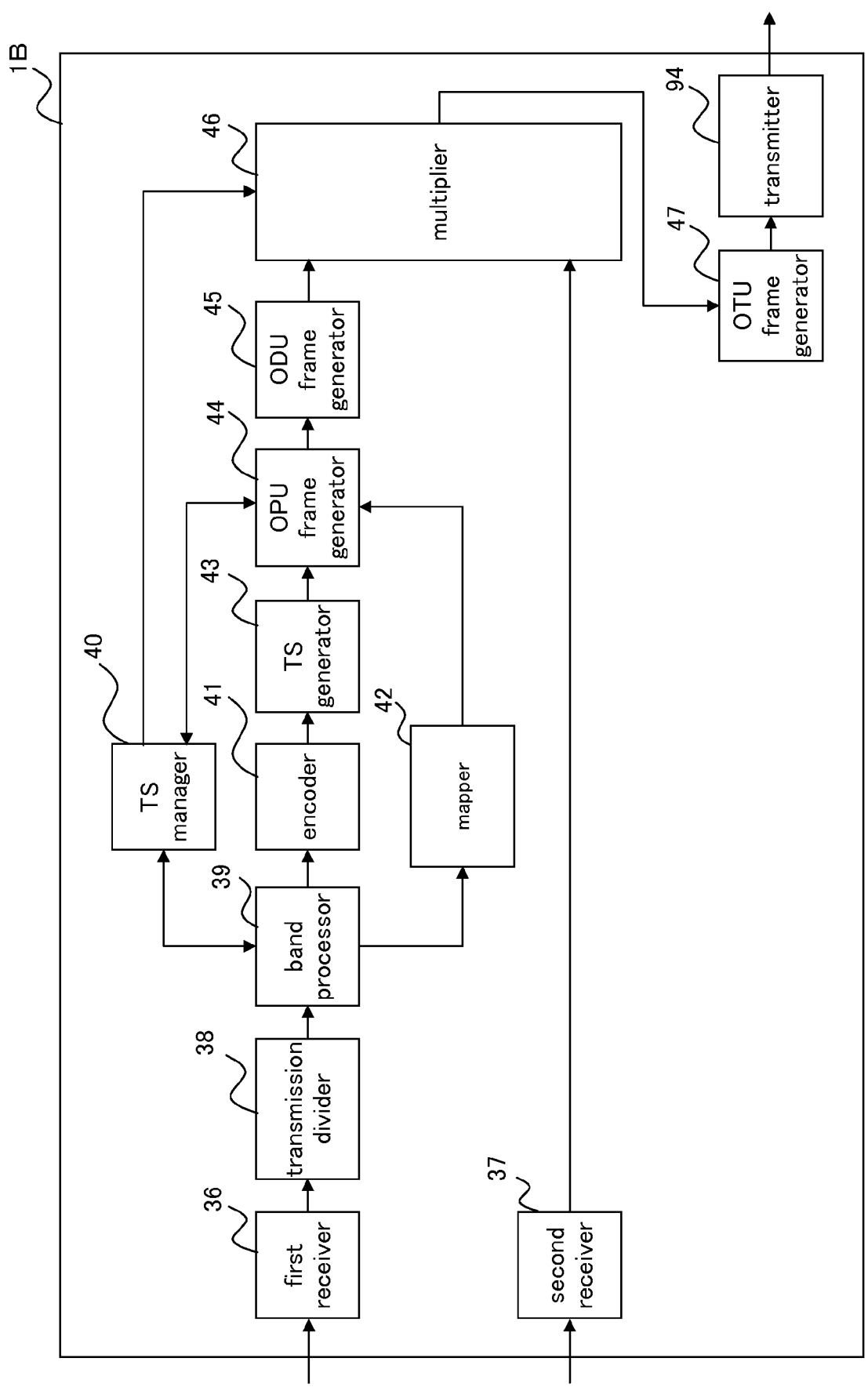
FIG. 15 is a diagram illustrating an example of the configuration of a transmission apparatus in accordance with a second example.

Next, an example of the configuration of the reception apparatus 1B in accordance with a second example is depicted in FIG. 15. As depicted in FIG. 15, the transmission apparatus 1A includes a first receiver 36, a second receiver 37, a transmission divider 38, a band processor 39, a TS manager 40, an encoder 41, and a mapper 42, for example. The transmission apparatus 1B also includes a TS generator 43, an OPU frame generator 44, an ODU frame generator 45, a multiplier 46, an OTU frame generator 47, and a transmitter 94, for example.

Note that the first receiver 36, the second receiver 37, the transmission divider 38, the TS manager 40, the encoder 41, the TS generator 43, the OPU frame generator 44, the ODU frame generator 45, the multiplier 46, the OTU frame generator 47 and the transmitter 94 have functions to similar to those of the first receiver 17, the second receiver 18, the transmission divider 19, the TS manager 21, the encoder 22, the TS generator 23, the OPU frame generator 24, the ODU frame generator 25, the multiplier 26, the OTU frame generator 27, and the transmitter 93 in the first example, respectively.

In other words, the first receiver 36 and the second receiver 37 function as an example of the receiver 5 in accordance with an embodiment described above. Further, the transmitter 94 functions as an example of the transmitter 7 in accordance with an embodiment.

Here, the band processor 39 in the present example executes predetermined band processing on the each of the traffics separated at the transmission divider 38. For example, client signals having bands equal to or smaller than the CIR are transmitted to the encoder 41 and accommodated into TSs, while client signals having bands equal to or greater than the EIR are transmitted to the mapper 42 and accommodated into specialized TSs.

Client signals having bands equal to or greater than the EIR may be assigned to specialized TSs, after statistical multiplying for each instance. This is because best effort is sufficient for the client signals having bands equal to or greater than the EIR.

The mapper 42 maps a client signal input from the band processor 39 to a specialized TS. Further, when the CIR is increased, the mapper 42 may remap a client signal that has been mapped to a specialized TS to a vacant TS which becomes available due to the increase in the CIR.

In other words, the transmission divider 38, the band processor 39, the TS manager 40, the encoder 41, the mapper 42, the TS generator 43, the OPU frame generator 44, the ODU frame generator 45, the multiplier 46, and the OTU frame generator 47 function as an example of the frame processor 6 in accordance with an embodiment.

Thereby, in the present example, multiplication becomes available while maintaining the quality, i.e., the service band.

(4) Third Embodiment

Alternatively, redundancy can be provided by providing multiple transmission routes between a transmission apparatus 1C and a reception apparatus 2C, for example, as will be described in the present example.

Figure 16:
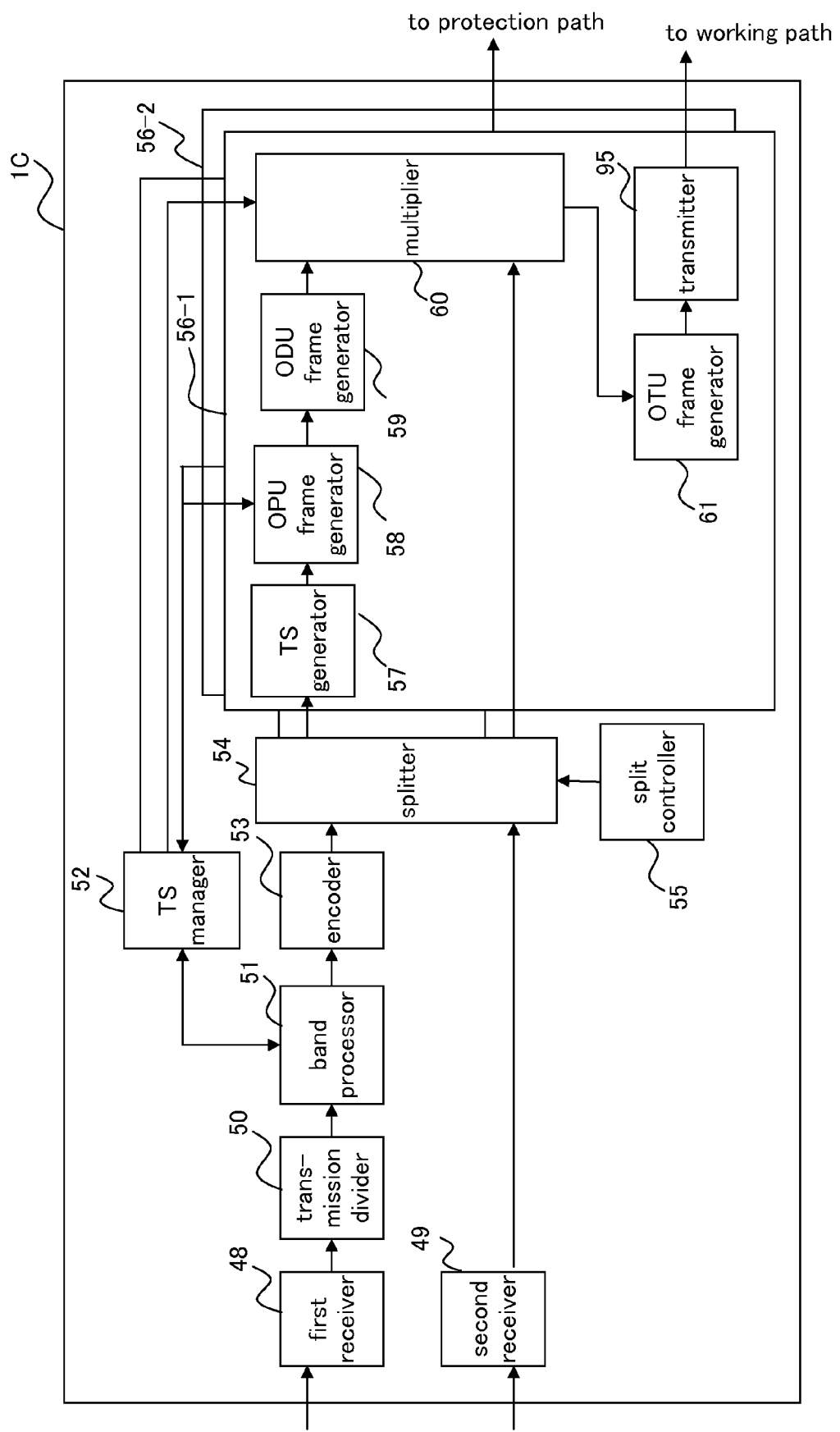
FIG. 16 is a diagram illustrating an example of the configuration of a transmission apparatus in accordance with a third example.

FIG. 16 is a diagram illustrating an example of the configuration of a transmission apparatus 1C in accordance with a third example. As depicted in FIG. 16, the transmission apparatus 1C includes, a first receiver 48, a second receiver 49, a transmission divider 50, a band processor 51, a TS manager 52, an encoder 53, a splitter 54, a split controller 55, a first transmitter 56-1, and a second transmitter 56-2, for example.

Note that the first receiver 48, the second receiver 49, the transmission divider 50, the band processor 51, the TS manager 52, and the encoder 53 have functions similar to those of the first receiver 17, the second receiver 18, the transmission divider 19, the band processor 20, the TS manager 21, and the encoder 22, respectively.

In other words, the first receiver 48 and the second receiver 49 function as an example of the receiver 5 in accordance with an embodiment described above.

Here, the first transmitter 56-1 sends an OTU frame to the reception apparatus 2C through a working path. For that purpose, the first transmitter 56-1 includes a TS generator 57, an OPU frame generator 58, an ODU frame generator 59, a multiplier 60, an OTU frame generator 61, and a transmitter 95, for example. Note that the TS generator 57, the OPU frame generator 58, the ODU frame generator 59, the multiplier 60, the OTU frame generator 61, and the transmitter 95 have functions similar to those of the TS generator 23, the OPU frame generator 24, the ODU frame generator 25, the multiplier 26, the OTU frame generator 27, and the transmitter 93, respectively.

In other words, the transmitter 95 functions as an example of the receiver 7 in accordance with an embodiment.

The second transmitter 56-2 sends an OTU frame to the reception apparatus 2C through a protection path. For that purpose, the second transmitter 56-2 has the same configuration as the first transmitter 56-1. Note that multiple protection paths may be provided.

The splitter 54 transmits a traffic input from the encoder 53 to at least one of the TS generator 57 in the first transmitter 56-1 and the TS generator 57 in the second transmitter 56-2.

The split controller 55 controls the destination of the traffic in the splitter 54. For example, if a failure occurs in a working path, the split controller 55 may control the splitter 54 to switch from the current route. If the working path recovers from the failure, the split controller 55 may control the splitter 54 to switch the route from a protection path to the working path. If a failure has not been eliminated yet, the split controller 55 may control the splitter 54 to transmit traffic to both the working path and the protection path, in order to provide redundancy. Note that occurrence of a failure on a working path can be detected, based on warning transfer information, such as an alarm indication signal (AIS) and a remote defect indicator (RDI) stored in the overhead region in an OTN frame, and an automatic protection switching (APS) signal defined in PSI information in an S-ODU/S-OPU frame.

In other words, the splitter 54 and the split controller 55 function as an example of a switch that switches a transmission route to another transmission route, based on a notification from the reception apparatus 2C. Further, the transmission divider 50, the band processor 51, The TS manager 52, the encoder 53, the splitter 54, the split controller 55, the TS generator 57, the OPU frame generator 58, the ODU frame generator 59, the multiplier 60, the OTU frame generator 61, and the transmitter 95 functions as an example of the frame processor 6 in accordance with an embodiment.

Figure 17:
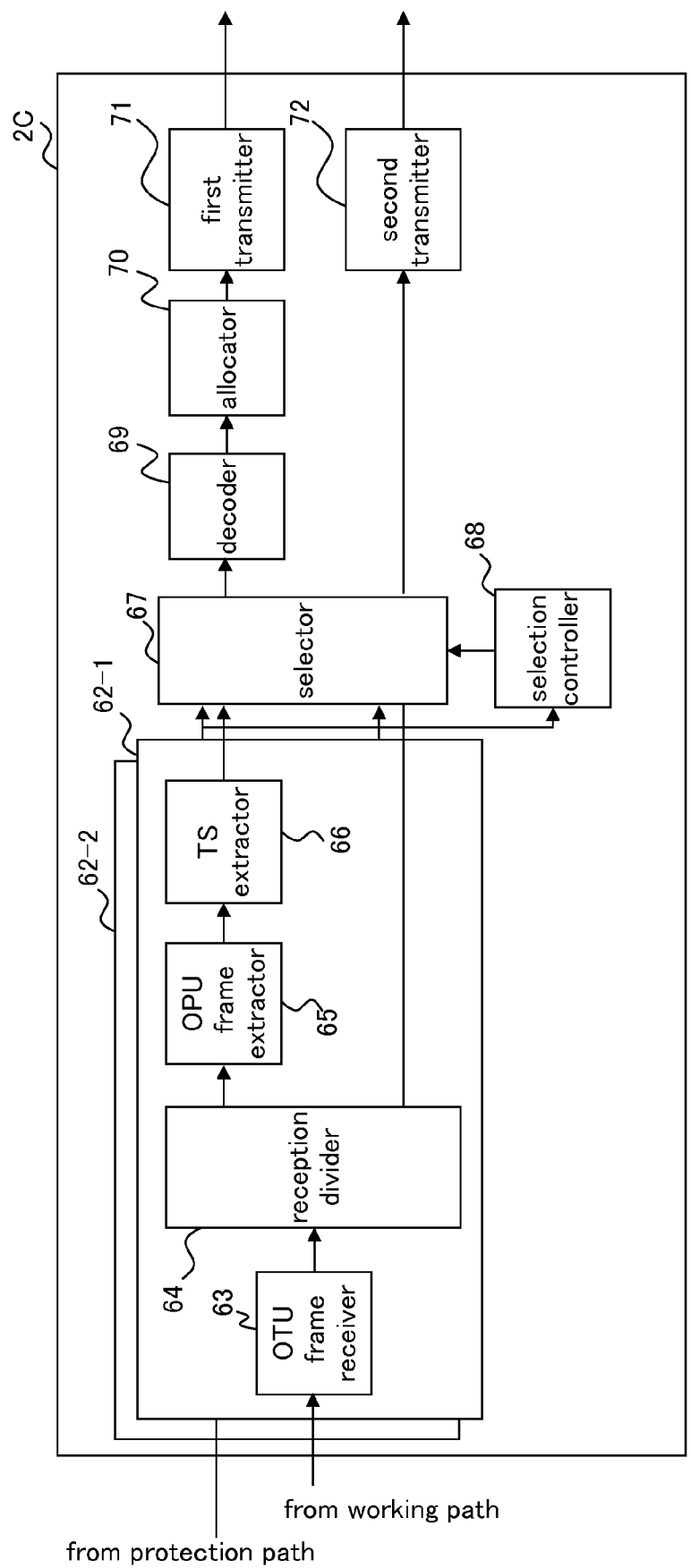
FIG. 17 is a diagram illustrating an example of the configuration of a reception apparatus in accordance with the third example.

Next, an example of the configuration of the reception apparatus 2C in accordance with the third example is depicted in FIG. 17. As depicted in FIG. 17, the reception apparatus 2C includes a first receiver 62-1, a second receiver 62-2, a selector 67, a selection controller 68, a decoder 69, an allocator 70, a first transmitter 71, and a second transmitter 72, for example.

Note that the decoder 69, the allocator 70, the first transmitter 71 and the second transmitter 72 have functions similar to those of the decoder 32, the allocator 33, the first transmitter 34 and the second transmitter 35 in the first example, respectively.

In other words, the first transmitter 71 and the second transmitter 72 function as an example of the transmitter 10 in accordance with an embodiment.

Here, the first receiver 62-1 receives an OTU frame from the transmission apparatus 1C through a working path. For that purpose, the first receiver 62-1 includes an OTU frame receiver 64, a reception divider 65, an OPU frame extractor 66, and a TS extractor 67. Note that the OTU frame receiver 64, the reception divider 65, the OPU frame extractor 66 and the TS extractor 67 have functions similar to those of the OTU frame receiver 28, the divider 29, the OPU frame extractor 30 and the TS extractor 31 in the first example, respectively.

The second receiver 62-2 receives an OTU frame from the transmission apparatus 1C through a protection path. For that purpose, the second receiver 62-2 has the same configuration as the receiver transmitter 62-1. Note that multiple protection paths may be provided.

In other words, the OTU frame receiver 64 functions as an example of the receiver 8 in accordance with an embodiment.

The selector 67 selects at least one of the first receiver 62-1 and the second receiver 62-2, and receives a client signal extracted from an OTU frame.

The selection controller 68 controls the reception operation in the selector 67. For example, the selection controller 68 detects occurrence of a failure on a working path of multiple paths between the transmission apparatus 1C and the reception apparatus 2C, based on control information, such as warning transfer information included in the OTN frame. The selection controller 68 also notifies the transmission apparatus 1C of the result of the detection.

In other words, the selection controller 68 functions as an example of a failure detector that detects occurrence of a failure on a working transmission route of multiple transmission routes, based on control information on the client signal included in a frame generated by the transmission apparatus 1C, as well as functioning as an example of a failure notifier that notifies the transmission apparatus 1C of the result of the detection. Further, the reception divider 64, the OPU frame extractor 65, the TS extractor 66, the selector 67, the selection controller 68, the decoder 69 and the allocator 70 function as an example of the extractor 9 in accordance with an embodiment.

Here, an example of the operations of the transmission apparatus 1C and the reception apparatus 2C in the present example will be described, with reference to FIGS. 18 and 19.

Figure 18:
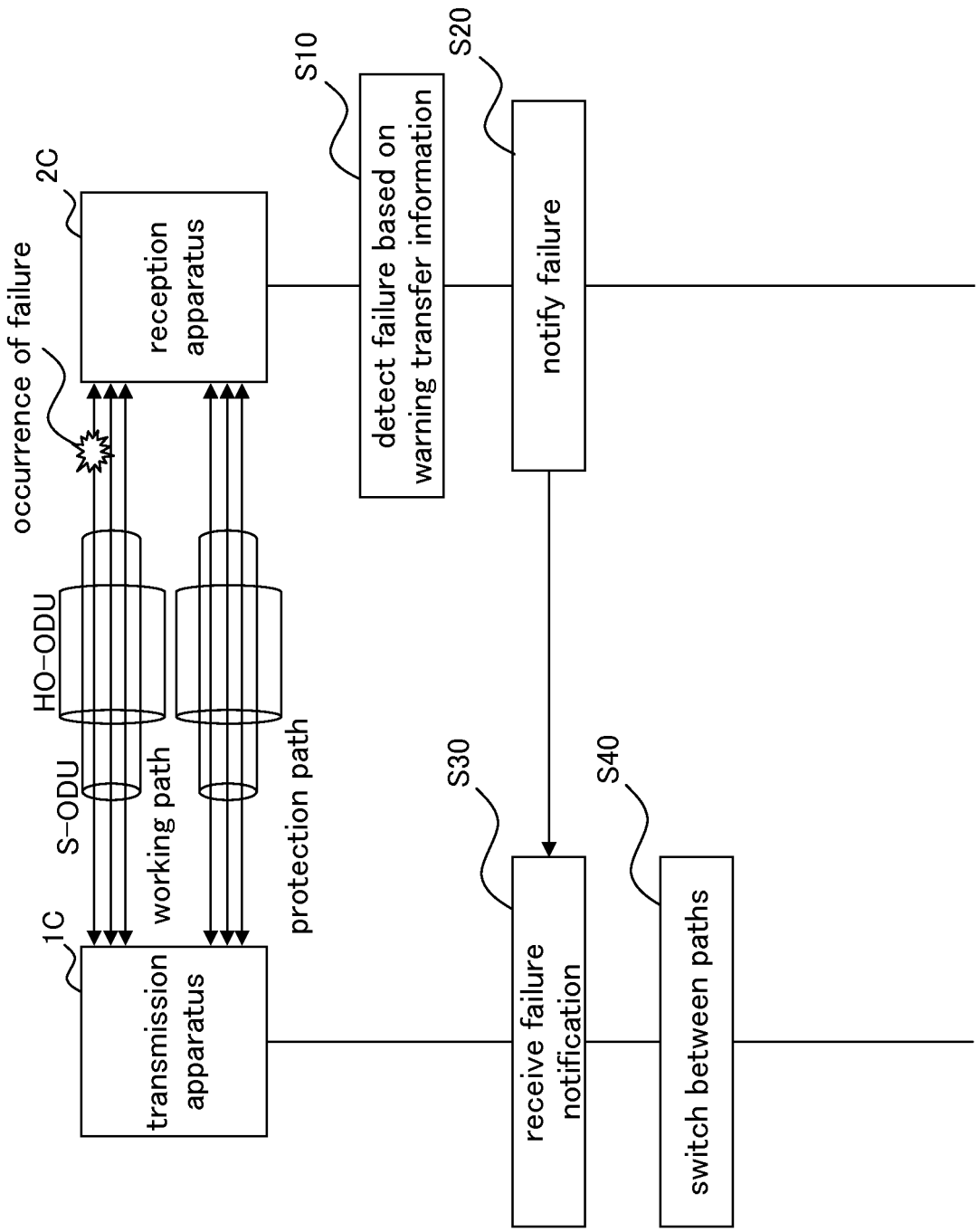
FIG. 18 is a diagram illustrating an example of the operation of a transmission system in accordance with the third example.

Firstly, as depicted in FIG. 18, for example, while the transmission apparatus 1C and the reception apparatus 2C are transmitting OTN frames using a working path, a failure, such as disconnection in the transmission path, occurs on the working path. The reception apparatus 2C detects the occurrence of the failure, based on warning transfer information included in an OTN frame (Step S 10).

Then, the reception apparatus 2C notifies the transmission apparatus 1C of the occurrence of the failure (Step S 20).

When receiving the notification of the occurrence of the failure from the reception apparatus 2C (Step S 30), the transmission apparatus 1C switches the route from the working path to a protection path (Step S 40).

Figure 19:
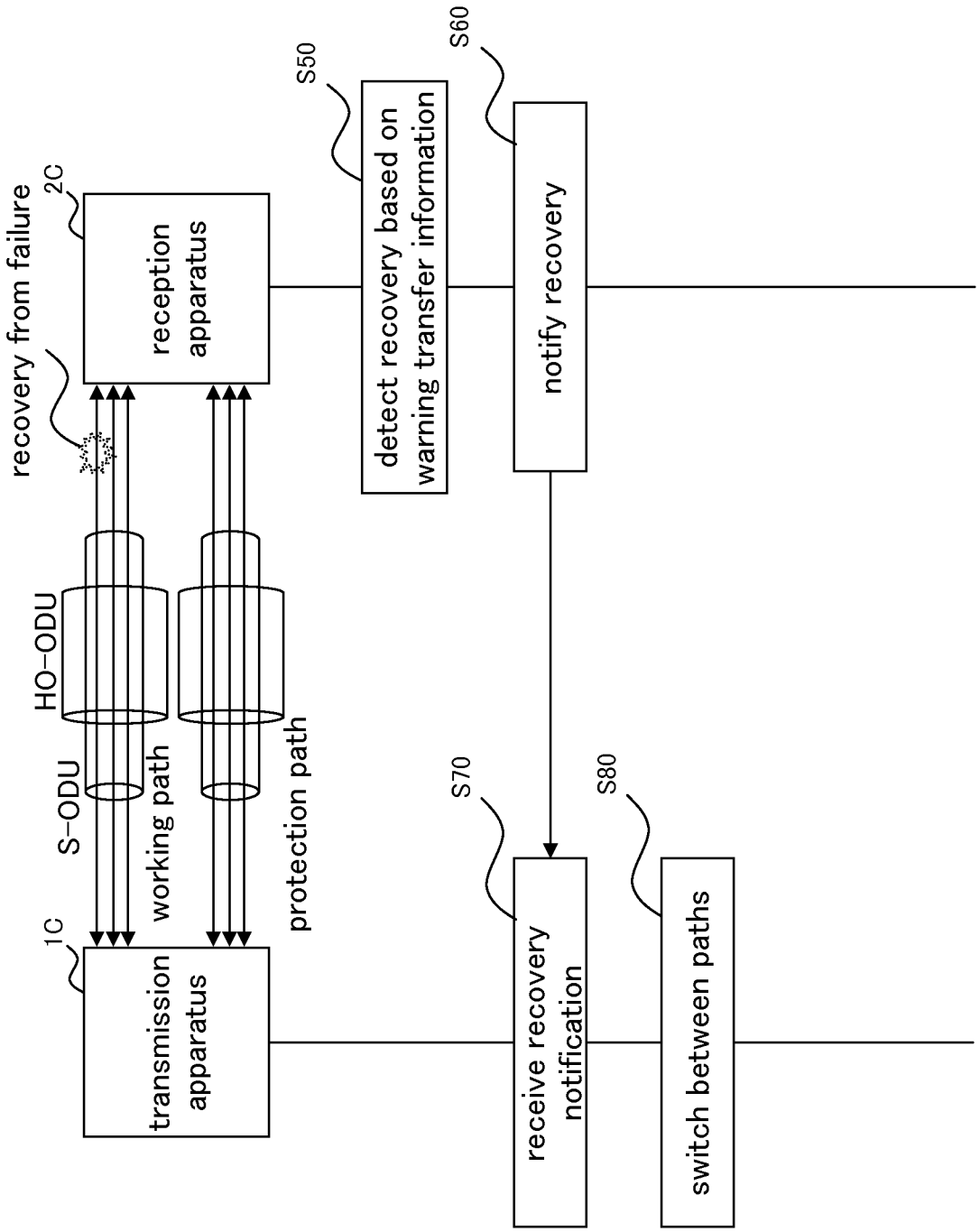
FIG. 19 is a diagram illustrating an example of the operation of the transmission system in accordance with the third example.

In the meantime, as depicted in FIG. 19, when the working path is recovered from the failure, the reception apparatus 2C detects the recovery from the failure, based on warning transfer information (Step S 50).

Then, the reception apparatus 2C notifies the transmission apparatus 1C of the recovery from the failure (Step S 60).

When receiving the recovery of the occurrence of the failure from the reception apparatus 2C (Step S 70), the transmission apparatus 1C switches the route from the protection path to the working path (Step S 80).

As described above, in the present example, control information, such as warning transfer information, set in PSI information in an S-OPU frame enables control of switching between transmission routes upon a failure.

Alternatively, control on switching between transmission routes similar to the above-described control may be achieved by providing an automatic protection switching/protection communication channel (APS/PCC) field in the overhead region in an S-ODU frame, for example. In this case, in order to achieve operations in a unit of TS, multiframe processing for the APS/PCC field may be combined with multiplex structure identifiers (MSIs).

(5) Fourth Example

Figure 20:
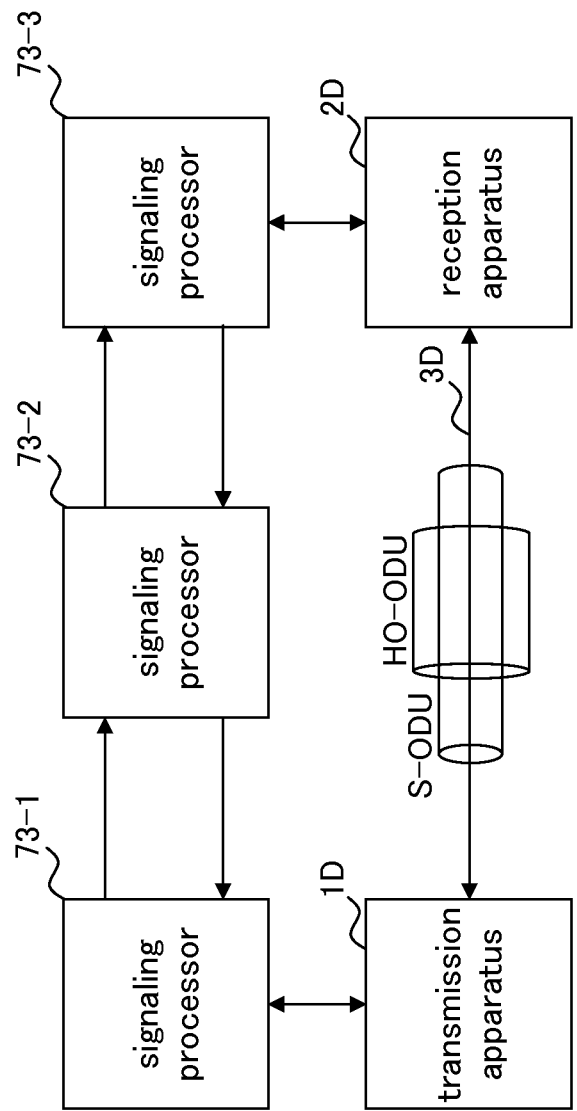
FIG. 20 is a diagram illustrating an example of the configuration of a transmission system in accordance with a fourth example.

FIG. 20 is a diagram illustrating an example of the configuration of a transmission system in accordance with a fourth example. The transmission system depicted in FIG. 20 includes a transmission apparatus 1D, a reception apparatus 2D, a transmission path 3D, and signaling processors 73-1, 73-2, and 73-3, for example. Note that the transmission apparatus 1D has functions similar to those of the transmission apparatuses 1, 1A, and 1B, and the reception apparatus 2D has functions similar to those of the transmission apparatuses 2, 2A, and 2B, in the embodiment and the examples set forth above.

In the present example, control information, such as identification information for identifying an S-ODU frame in a multiplied frame, and information on the location where the S-ODU frame is accommodated in the multiplied frame and where a TS is placed in the S-ODU frame, may be sent and received between the transmission apparatus 1D and the reception apparatus 2D, using signaling protocols, such as the resource reservation protocol with traffic extensions (RSVP-TE) defined in the Request For Comments (RFC) 3471, the RFC 3473, and the RFC 4328.

For example, the signaling processors 73-1, 73-2, and 73-3 send a "PATH" message from the transmission apparatus 1D side to the reception apparatus 2D side, as well as sending a "RESV" message from the reception apparatus 2D side to the transmission apparatus 1D side. A "PATH" message and a "RESV" message may include control information set forth above.

Thereby, the transmission apparatus 1D and the reception apparatus 2D can share control information, such as identification information for identifying an S-ODU frame in a multiplied frame, and information on the location where the S-ODU frame is accommodated in the multiplied frame and where a TS is placed in the S-ODU frame.

Figures 21A, 21B:
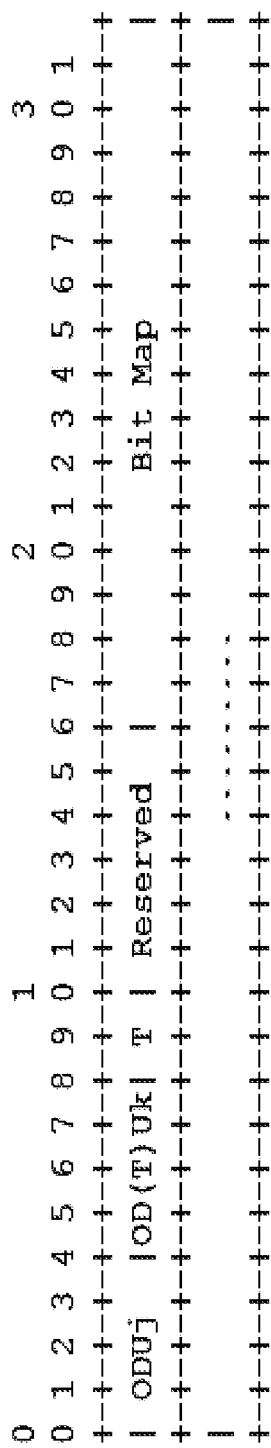
FIGS. 21A and 21B are diagrams illustrating examples of a signaling method.

When taking the draft "draft-zhang-ccamp-gmpls-evolving-g709" in the Internet Engineering Task Force (IETF), which is an extension of the OTN signaling, as an example of a particular signaling scheme, for example, as depicted in FIG. 21A, an S-ODU frame can be defined by setting a predetermined value to the region labeled as "ODU j" in the label space in ODUk.

The values to be assigned to the region labeled as "ODU j" are depicted in FIG. 21B. As depicted in FIG. 21B, the values 8 to 15 are reserved values (Reserved), which can be used as values for indicating the signal type of an S-ODU frame.

As for signaling in an S-ODU frame, such as a TS stored in the payload region in the S-ODU frame, when taking the draft "draft-ceccarellifuxh-ccamp-gmpls-ext-for-evol-otn" as an example, as depicted in FIG. 22A, an S-ODU frame can be defined by assigning a predetermined value to the region labeled as "Signal Type".

The values to be assigned to the region labeled as "Signal Type" are depicted in FIG. 22B. As depicted in FIG. 22B, the values 4, 5, and 20-225 are reserved values (Reserved), which may be used as values for indicating the signal type of an S-ODU frame.

Figure 23:
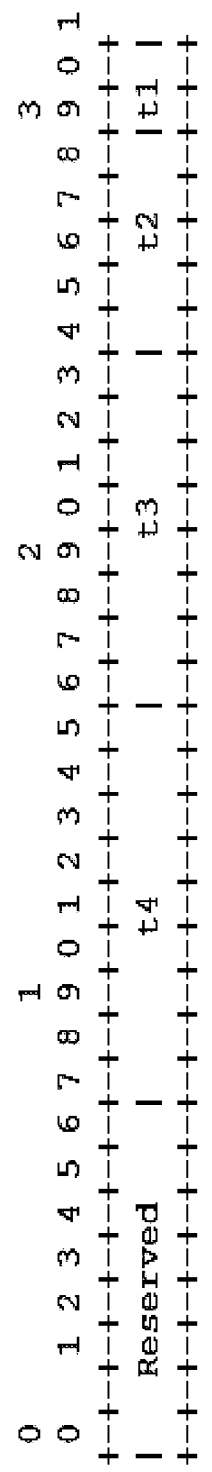
FIG. 23 is a diagram illustrating an example of a signaling method.

Alternatively, as depicted in FIG. 23, where a TS is to be placed in an S-ODU frame may be defined by newly defining it in the "Generalized label" (ODUk label space) field.

Note that the above-described functions of the signaling processors 73-1, 73-2, and 73-3 may be provided in the transmission apparatus 1D and the reception apparatus 2D. In this case, the signaling processors 73-1, 73-2, and 73-3 can be omitted.

(6) Fifth Example

Figure 24:
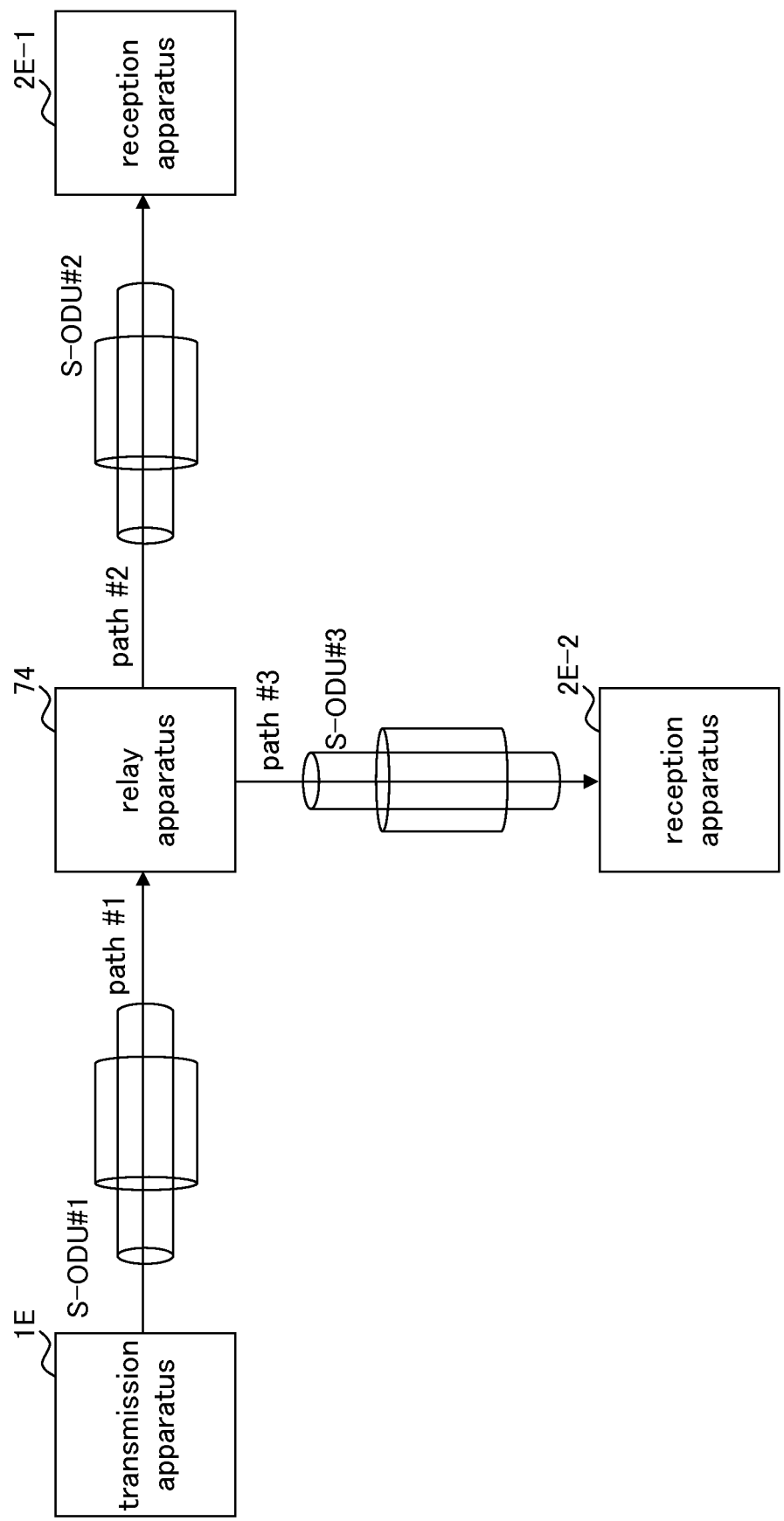
FIG. 24 is a diagram illustrating an example of the configuration of a transmission system in accordance with a fifth example.

FIG. 24 is a diagram illustrating an example of the configuration of a transmission system in accordance with a fifth example. The transmission system depicted in FIG. 24 includes a transmission apparatus 1E, a relay apparatus 74, and reception apparatuses 2E-1 and 2E-2, for example. The transmission apparatus 1E and the relay apparatus 74 are connected to each other through a path #1, the relay apparatus 74 and the reception apparatus 2E-1 are connected to each other through a path #2, and the relay apparatus 74 and the reception apparatus 2E-2 are connected to each other through a path #3. Note that the transmission apparatus 1E has functions similar to those of the transmission apparatuses 1, 1A, 1B, and 1D in the embodiment and the examples set forth above, while the reception apparatuses 2E-1 and 2E-2 have functions similar to those of the transmission apparatuses 2, 2A, 2B, and 2D in the embodiment and the examples set forth above.

Here, the relay apparatus 74 executes switching processing of client signals in a unit of TS included in an S-ODU frame. For example, in the example depicted in FIG. 24, the relay apparatus 74 extracts a TS from S-ODU frame #1 received from the transmission apparatus 1E through the path #1, and transmits the Ts to the reception apparatus 2E-1 or the reception apparatus 2E-2 in accordance with a switching table. At this time, the TS is accommodated in an S-ODU frame #2 or an S-ODU frame #3, which is transmitted to the path #2 or the path #3. Alternatively, the relay apparatus 74 may copy a TS included in an S-ODU frame #1 received from the transmission apparatus 1E through the path #1, and transmit the copy to the paths #2 and #3.

Figure 25:
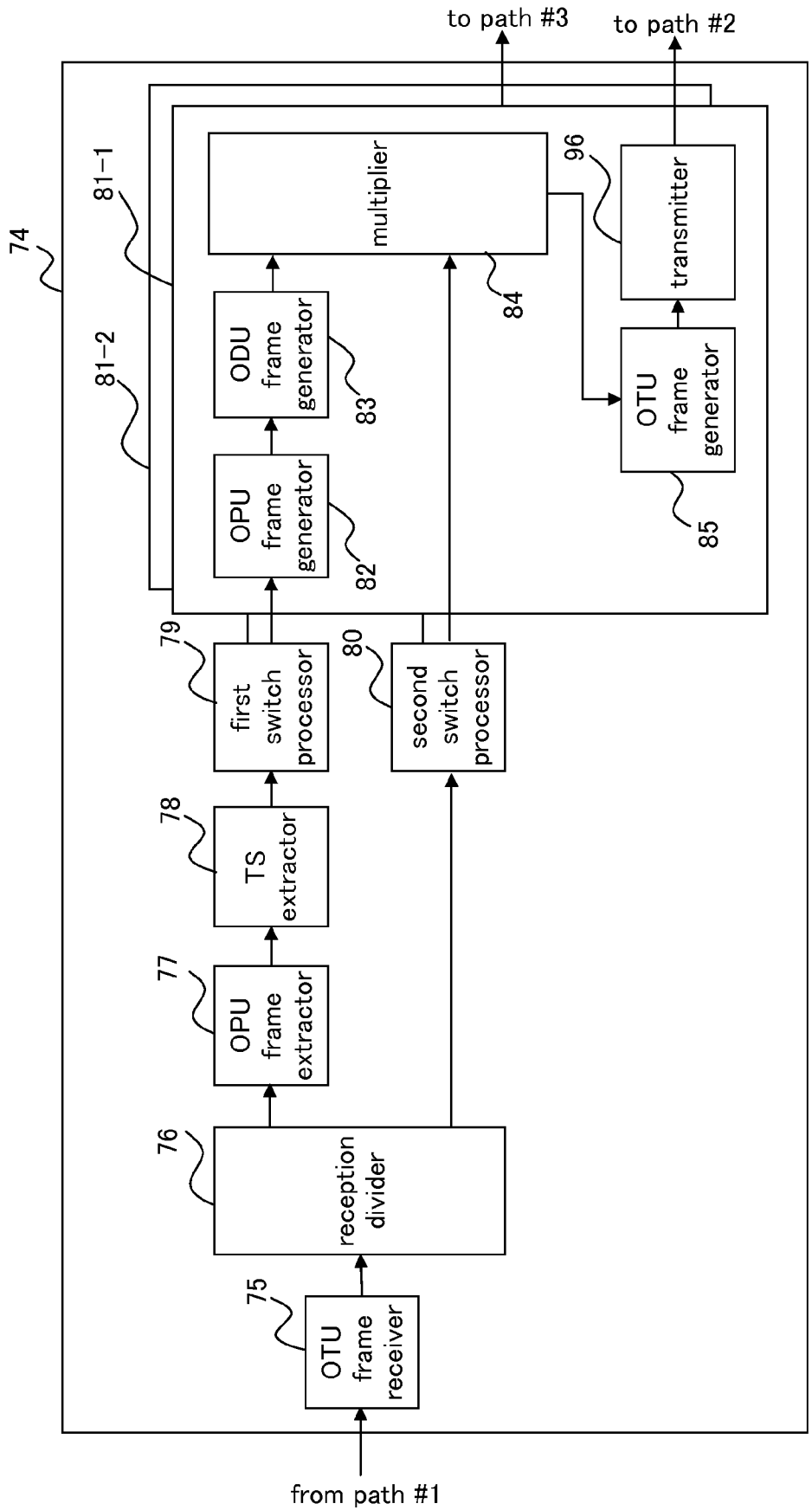
FIG. 25 is a diagram illustrating an example of the configuration of a relay apparatus depicted in FIG. 24.

For that purpose, as depicted in FIG. 25, the relay apparatus 74 includes an OTU frame receiver 75, a reception divider 76, an OPU frame extractor 77, a TS extractor 78, a first switch processor 79, a second switch processor 80, a first transmitter 81-1, and a second transmitter 81-2, for example. Note that the OTU frame receiver 75, the reception divider 76, the OPU frame extractor 77 and the TS extractor 78 have functions similar to those of the OTU frame receiver 28, the reception divider 29, the OPU frame extractor 30 and the TS extractor 31 in the first example, respectively.

In other words, the OTU frame receiver 75 functions as an example of a relay receiver that receives a frame generated in transmission apparatus 1E through the path #1.

Further, the TS extractor 78 functions as an example of a relay extractor that extract a client signal included in a frame received by the OTU frame receiver 75, based on the location information indicating the location where a client signal is to be accommodated.

Here, the first transmitter 81-1 sends an OTU frame to the reception apparatus 2E-1 through the path #2. For that purpose, the first transmission apparatus 81-1 includes an OPU frame generator 82, an ODU frame generator 83, a multiplier 84, an OTU frame generator 85, and a transmitter 96, for example. Note that the OPU frame generator 82, the ODU frame generator 83, the multiplier 84, the OTU frame generator 85, and the transmitter 96 have functions similar to those of the OPU frame generator 24, the ODU frame generator 25, the multiplier 26, and the OTU frame generator 27 in the first example, respectively.

Further, the second transmitter 81-2 sends an OTU frame to the reception apparatus 2E-2 through the path #3. For that purpose, the second transmitter 81-2 has the same configuration as the first transmitter 81-1.

The first switch processor 79 transmits a client signal extracted by the TS extractor 78 from an S-ODU frame to at least one of the first transmitter 81-1 and the second transmitter 81-2. Specifically, for example, the first switch processor 79 includes a switching table that retains the relationship between a client signal and the destination of that client signal.

FIG. 26 depicts an example of the switching table. The switching table depicted in FIG. 26 defines that TSs {a, b, c} stored in an S-ODU frame #1 input from the path #1 are to be stored in TSs {d, e, f} in an S-ODU frame #2, and that the TSs {d, e, f} are to be transmit from the path #2, for example. The switching table also defines that TSs {x, y} stored in the S-ODU frame #1 input from the path #3 are to be stored in TSs {v, w} in the S-ODU frame #12, and that the TSs {d, e, f} are to be transmit from the path #1.

Thereby, the first switch processor 79 can output a client signal accommodated in an S-ODU frame in a unit of TS, by switching to any of the paths.

In other words, the first switch processor 79 functions as an example of a destination retaining section that retains a relationship between a client signal and a destination of the client signal.

Further, the second transmitter 81-2 functions as an example of a relay transmitter that sends a client signal extracted by the TS extractor 78 to another reception apparatus 2E-2, based on the relationship retained in the switching table.

Further, the second switch processor 80 extracts a client signal from an ODU frame separated by the reception divider 76, and transmits the extracted client signal to at least one of the first transmitter 81-1 and the second transmitter 81-2. Specifically, for example, the second switch processor 80 includes a switching table that retains the relationship between a client signal and the destination of that client signal, similar to the first switch processor 79

Thereby, the second switch processor 80 can output a client signal stored accommodated in an ODU frame in a unit of TS, by switching to any of the paths.

(7) Sixth Example

Figure 27:
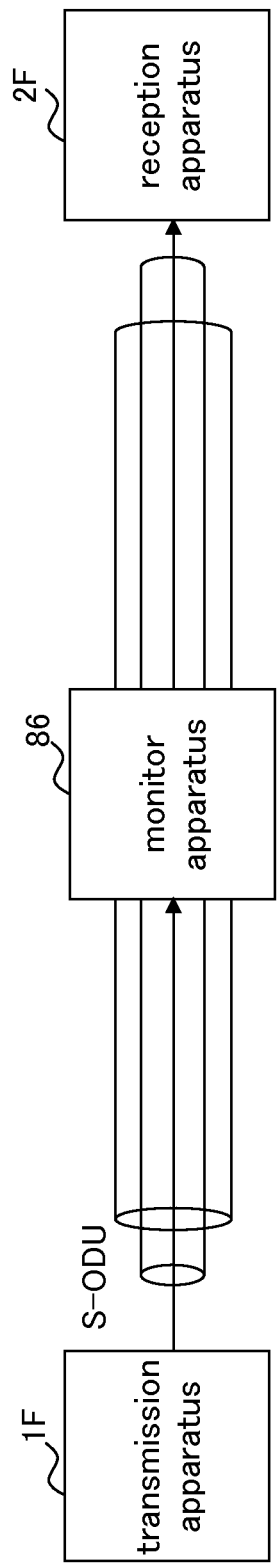
FIG. 27 is a diagram illustrating an example of the configuration of a transmission system in accordance with a sixth example.

FIG. 27 is a diagram illustrating an example of the configuration of a transmission system in accordance with a sixth example. The transmission system depicted in FIG. 27 includes a transmission apparatus 1F, a monitor apparatus 86, and a reception apparatuses 2F, for example. Note that the transmission apparatus 1F has functions similar to those of the transmission apparatuses 1, 1A, 1B, 1D, and 1E in the embodiment and the examples set forth above, while the reception apparatuses 2E-1 and 2E-2 have functions similar to those of the transmission apparatuses 2, 2A, 2B, 2D, and 2E in the embodiment and the examples set forth above.

Here, the monitor apparatus 86 is provided between the transmission apparatus 1F and the reception apparatus 2F, and executes tandem connection monitoring (TCM) processing on a frame being transmitted between the transmission apparatus 1F and the reception apparatus 2F. That is, the TCM processing is executed between the transmission apparatus 1F and the monitor apparatus 86, and/or between the monitor apparatus 86 and the reception apparatus 2F.

Figure 28:
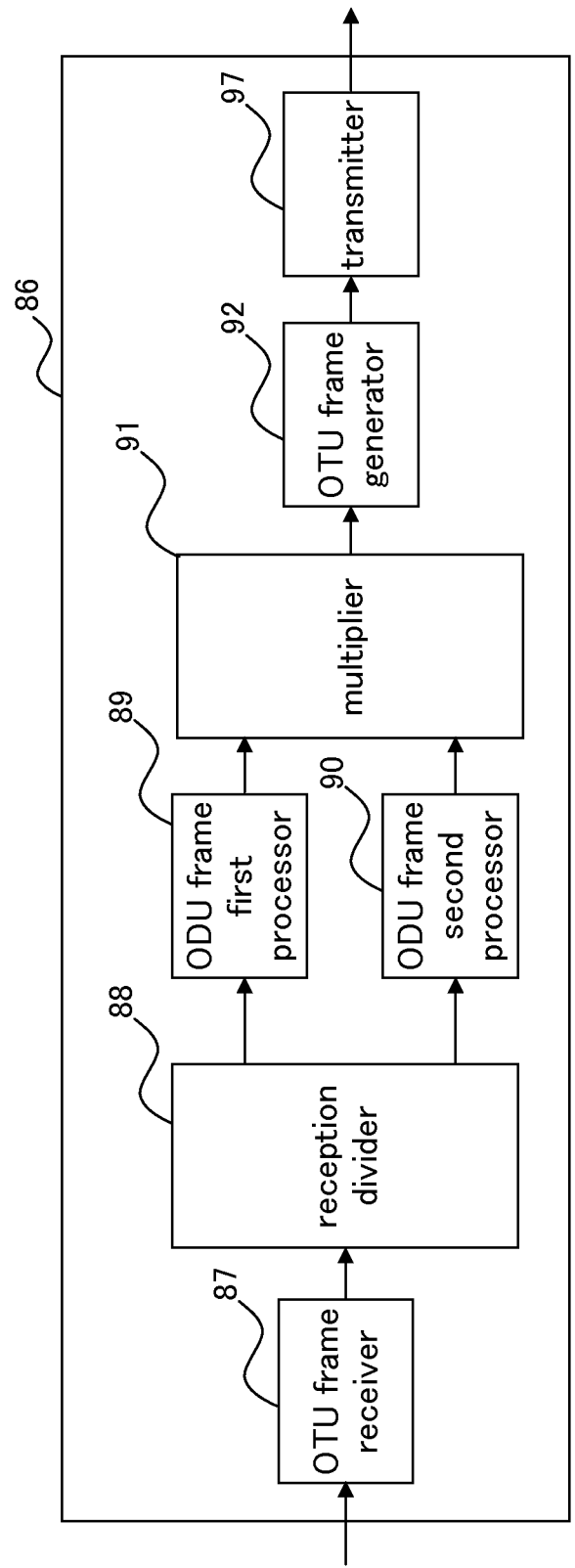
FIG. 28 is a diagram illustrating an example of the configuration of a monitor apparatus depicted in FIG. 27.

For that purpose, as depicted in FIG. 28, the monitor apparatus 86 includes an OTU frame receiver 87, a reception divider 88, an ODU frame first processor 89, an ODU frame second processor 90, a multiplier 91, an OTU frame generator 92, and a transmitter 97, for example. Note that the OTU frame receiver 87, the reception divider 88, the multiplier 91, the OTU frame generator 92, and the transmitter 97 have functions similar to those of the OTU frame receiver 28, the reception divider 29, the multiplier 26, the OTU frame generator 27, and the transmitter 93 in the first example, respectively.

Here, the ODU frame first processor 89 executes TCM processing on an S-ODU frame separated by the reception divider 88.

The ODU frame second processor 90 executes TCM processing on an ODU frame separated by the reception divider 88.

Thereby, linear protection defined in the G.873.1 by the ITU-T can be provided for TCM, for example, and a redundant system can be provided between the transmission apparatus 1F and the monitor apparatus 86, for example.

(8) Miscellaneous

Note that the configurations and functions of the transmission apparatuses 1, 1A, 1B, 1C, 1D, 1E, and 1F; the reception apparatus 2, 2A, 2C, 2D, 2E-1, 2E-2, and 2F; the signaling processors 73-1, 73-2, and 73-3; the relay apparatus 74; the monitor apparatus 86 in the embodiment and the examples set forth above may be selected where required, or may be combined appropriately. In other words, the configurations and functions described above may be appropriately selected or combined together such that the functions of the present invention are achieved.

As set forth above in detail, since the present invention makes client signals to be accommodated in frames more flexibly and efficiently, which improves the transmission efficiency of the network, the present invention is construed as highly useful in the field of the optical transmission technique.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A method of accommodating signals in a frame generation apparatus that generates a first frame, the first frame comprising a payload region in which a client signal is to be accommodated, and an overhead region accommodating first location information indicating a location where the client signal is to be accommodated, the first frame being able to be processed as an m (m is an integer equal to or greater than 2) -byte cycle multiframe, the method comprising:
 defining the first location information as a multiframe including n (n is an integer equal to or greater than 2) sub-multiframes each having m-byte cycle;
 defining, using the first location information defined as the multiframe, the location where the client signal is to be accommodated in the payload region; and
 accommodating the client signal in the payload region, based on the defined location where the client signal is to be accommodated, wherein
 the first frame is accommodated in at least one of a plurality of slot regions of a second frame, the second frame including the plurality of slot regions and a second location information having a size of m bytes, each of the plurality of slot regions having a predetermined size, the second location information including type information indicating a type of each of the plurality of slot regions, and
 the type information indicates whether at least a part of the first frame is accommodated in each of the plurality of slot regions, wherein the first frame is an optical channel payload unit (OPU) frame and the second frame is an optical channel data unit (ODU) frame.

2. A method of accommodating signals in a frame generation apparatus that generates an optical channel payload unit (OPU) frame, the OPU frame comprising a payload region in which a client signal is to be accommodated, and an overhead region accommodating first payload structure identifier (PSI) information indicating a location where the client signal is to be accommodated, the OPU frame being able to be processed as a 256-byte cycle multiframe, the method comprising:
  defining the first PSI information as a multiframe including n (n is an integer equal to or greater than 2) sub-multiframes each having 256-byte cycle;
  defining, using the first PSI information defined as the multiframe, the location where the client signal is to be accommodated in the payload region; and
  accommodating the client signal in the payload region, based on the defined location where the client signal is to be accommodated, wherein
  the OPU frame is accommodated in at least one of a plurality of slot regions of an optical channel data unit (ODU) frame, the ODU frame including the plurality of slot regions and second PSI information having a size of 256 bytes, each of the plurality of slot regions having a predetermined size, the second PSI information including type information indicating a type of each of the plurality of slot regions, and
  the type information indicates whether at least a part of the OPU frame is accommodated in each of the plurality of slot regions.

3. A frame generation apparatus that generates a first frame, the first frame comprising a payload region in which a client signal is to be accommodated, and an overhead region accommodating first location information indicating a location where the client signal is to be accommodated, the first frame being able to be processed as an m (m is an integer equal to or greater than 2) -byte cycle multiframe, the frame generation apparatus comprising: a location information defining section that defines the first location information as a multiframe including n (n is an integer equal to or greater than 2) sub-multiframes each having m-byte cycle; an accommodation location defining section that defines, using the first location information defined by the location information defining section as the multiframe, the location where the client signal is to be accommodated in the payload region; and a frame generator that generates the first frame by accommodating the client signal in the payload region, based on the location where the client signal is to be accommodated, defined by the accommodation location defining section, wherein the frame generator generates a second frame, which includes a plurality of slot regions and a second location information having a size of m bytes, in such a manner that the first frame is accommodated in at least one of the plurality of slot regions, each of the plurality of slot regions having a predetermined size, the second location information including type information indicating a type of each of the plurality of slot regions, and the type information indicates whether at least a part of the first frame is accommodated in each of the plurality of slot regions, wherein the first frame is an optical channel payload unit (OPU) frame and the second frame is an optical channel data unit (ODU) frame.

4. The frame generation apparatus according to claim 3, wherein the accommodation location defining section accommodates storage information on where the client signal is to be accommodated in the payload region, in the n sub-multiframes.

5. A frame generation apparatus that generates an optical channel payload unit (OPU) frame, the OPU frame comprising a payload region in which a client signal is to be accommodated, and an overhead region accommodating first payload structure identifier (PSI) information indicating a location where the client signal is to be accommodated, the OPU frame being able to be processed as a 256-byte cycle multiframe, the frame generation apparatus comprising:
  a location information defining section that defines the first PSI information as a multiframe including n (n is an integer equal to or greater than 2) sub-multiframes each having 256-byte cycle;
  an accommodation location defining section that defines, using the first PSI information defined by the location information defining section as the multiframe, the location where the client signal is to be accommodated in the payload region; and
  a frame generator that generates an OPU frame by accommodating the client signal in the payload region, based on the location where the client signal is to be accommodated, defined by the accommodation location defining section, wherein
  the frame generator generates an optical channel data unit (ODU) frame, which includes a plurality of slot regions and second PSI information having a size of 256 bytes, in such a manner that the OPU frame is accommodated in at least one of the plurality of slot regions, each of the plurality of slot regions having a predetermined size, the second PSI information including type information indicating a type of each of the plurality of slot regions, and
  the type information indicates whether at least a part of the OPU frame is accommodated in each of the plurality of slot regions.

6. The frame generation apparatus according to claim 5, wherein the accommodation location defining section accommodates information on a tributary slot (TS), in the n sub-multiframes.

7. The frame generation apparatus according to claim 4, wherein the location information defining section accommodates, in the n sub-multiframes, at least one of information indicating a type or a structure of the client signal accommodated in the payload region, information indicating a start position of each of the sub-multiframes, and information indicating sequence numbers of the sub-multiframes.

8. The frame generation apparatus according to claim 4, wherein the accommodation location defining section stores control information for the client signal accommodated in the payload region, in at least one of the n sub-multiframes.

9. The frame generation apparatus according to claim 5, wherein the frame generator generates the ODU frame by attaching an ODU overhead to the OPU frame.

10. The frame generation apparatus according to claim 9, wherein the frame generator generates a multiplied frame by multiplying the ODU frame.

11. The frame generation apparatus according to claim 10, wherein the frame generator accommodates identification information for identifying the ODU frame, in an undefined region in an overhead region in the multiplied frame.

12. The frame generation apparatus according to claim 3, wherein the frame generator accommodates the client signal in a region in the payload region, which varies depending on a band to be assured for the client signal.

13. A frame reception apparatus to be connected to the frame generation apparatus according to claim 3, the frame reception apparatus comprising:
  a receiver that receives the second frame generated in the frame generation apparatus; and
  an extractor that extracts the client signal from the second frame, based on the first and second location information.

14. A transmission system comprising:
the frame generation apparatus according to claim 3; and
the frame reception apparatus according to claim 13, connected to the frame generation apparatus.

15. The transmission system according to claim 14, further comprising
a plurality of transmission routes between the frame generation apparatus and the frame reception apparatus,
wherein the frame reception apparatus comprises:
a failure detector that detects occurrence of a failure in a working transmission route of the plurality of transmission routes, based on control information for the client signal included in the second frame generated by the frame generation apparatus; and
a failure notifier that notifies the frame generation apparatus of the result of the detection in the failure detector, and
the frame generation apparatus comprises a switch that switches to another transmission route, based on the notification from the failure notifier.

16. The transmission system according to claim 14, further comprising
a frame relay apparatus provided between the frame generation apparatus and the frame reception apparatus, and being connected to another frame reception apparatus, the frame relay apparatus comprising:
a relay receiver that receives the second frame generated in the frame generation apparatus;
a relay extractor that extracts the client signal from the second frame, based on the first and second location information;
a destination retaining section that retains a relationship between the client signal and a destination of the client signal; and
a relay transmitter that sends the client signal extracted by the relay extractor to the another frame reception apparatus, based on the relationship retained in the destination retaining section.

17. The transmission system according to claim 14, further comprising a monitor apparatus that is provided between the frame generation apparatus and the frame reception apparatus, and executes a tandem connection monitoring on the second frame being transmitted between the frame generation apparatus and the frame reception apparatus.

* * * * *